United States Patent
Palanki

(10) Patent No.: US 8,917,654 B2
(45) Date of Patent: Dec. 23, 2014

(54) FREQUENCY HOPPING DESIGN FOR SINGLE CARRIER FDMA SYSTEMS

(75) Inventor: Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/299,898

(22) Filed: Nov. 18, 2011

(65) Prior Publication Data

US 2012/0063441 A1 Mar. 15, 2012

Related U.S. Application Data

(62) Division of application No. 11/209,246, filed on Aug. 22, 2005.

(60) Provisional application No. 60/672,575, filed on Apr. 19, 2005, provisional application No. 60/691,755, filed on Jun. 16, 2005.

(51) Int. Cl.
- *H04B 7/204* (2006.01)
- *H04W 72/00* (2009.01)
- *H04B 1/7143* (2011.01)
- *H04L 27/26* (2006.01)

(52) U.S. Cl.
CPC .......... *H04B 1/7143* (2013.01); *H04L 27/2608* (2013.01)
USPC .......................................... 370/319; 455/450

(58) Field of Classification Search
USPC .......................................... 370/319; 455/450
See application file for complete search history.

(56) References Cited

U.S. PATENT DOCUMENTS

| 4,393,276 A | 7/1983 | Steele |
| 4,554,668 A | 11/1985 | Deman et al. |
| 4,747,137 A | 5/1988 | Matsunaga |
| 4,783,779 A * | 11/1988 | Takahata et al. ............... 370/344 |

(Continued)

FOREIGN PATENT DOCUMENTS

| AU | 2005319084 | 4/2010 |
| CA | 2348137 | 11/2001 |

(Continued)

OTHER PUBLICATIONS

3GPP TS 33.220 V.1.1.0 XX,XX, "3rd Generation Partnership Project; Technical Specification Group Services and System Aspects; Generic Authentication Architecture (GAA); Generic Bootstrapping Architecture (Release 6)" Feb. 9, 2004, pp. 1-17, figure 4, XP002996023.

(Continued)

*Primary Examiner* — Omoniyi Obayanju
(74) *Attorney, Agent, or Firm* — Peng Zhu

(57) ABSTRACT

Systems and methodologies are described that facilitate frequency hopping in a single carrier FDMA wireless environment by dynamically altering user offsets with time to obtain interference diversity. A channel tree can be utilized with nodes that are assigned values. User devices can be assigned to such nodes, a path between an assigned node and a root node in the channel tree can be evaluated, and a table lookup can be performed to determine an identity of a subcarrier set to assign to the user device assigned to a given node, as well as a number of subcarriers to be assigned to the user device. Additionally, node values can be dynamically varied during a communication event to alter path values and thus alter subcarrier set assignments.

70 Claims, 13 Drawing Sheets

(56) References Cited

U.S. PATENT DOCUMENTS

| | | |
|---|---|---|
| 4,783,780 A | 11/1988 | Alexis |
| 4,975,952 A | 12/1990 | Mabey et al. |
| 5,008,900 A | 4/1991 | Critchlow et al. |
| 5,115,248 A | 5/1992 | Roederer |
| 5,268,694 A | 12/1993 | Jan et al. |
| 5,282,222 A | 1/1994 | Fattouche et al. |
| 5,363,408 A | 11/1994 | Paik et al. |
| 5,371,761 A | 12/1994 | Daffara et al. |
| 5,384,410 A | 1/1995 | Kettner |
| 5,384,810 A | 1/1995 | Amrany |
| 5,406,551 A | 4/1995 | Saito et al. |
| 5,410,538 A | 4/1995 | Roche et al. |
| 5,455,839 A | 10/1995 | Eyuboglu |
| 5,465,253 A | 11/1995 | Rahnema |
| 5,491,727 A | 2/1996 | Petit |
| 5,513,379 A | 4/1996 | Benveniste et al. |
| 5,539,748 A | 7/1996 | Raith |
| 5,548,582 A | 8/1996 | Brajal et al. |
| 5,553,069 A | 9/1996 | Ueno et al. |
| 5,583,869 A | 12/1996 | Grube et al. |
| 5,594,738 A | 1/1997 | Crisler et al. |
| 5,604,744 A | 2/1997 | Andersson et al. |
| 5,612,978 A | 3/1997 | Blanchard et al. |
| 5,625,876 A | 4/1997 | Gilhousen et al. |
| 5,684,491 A | 11/1997 | Newman et al. |
| 5,726,978 A | 3/1998 | Frodigh et al. |
| 5,732,113 A | 3/1998 | Schmidl et al. |
| 5,745,487 A | 4/1998 | Hamaki |
| 5,768,276 A | 6/1998 | Diachina et al. |
| 5,790,537 A | 8/1998 | Yoon et al. |
| 5,812,938 A | 9/1998 | Gilhousen et al. |
| 5,815,488 A | 9/1998 | Williams et al. |
| 5,822,368 A | 10/1998 | Wang |
| 5,828,650 A | 10/1998 | Malkamaki et al. |
| 5,838,268 A | 11/1998 | Frenkel |
| 5,867,478 A | 2/1999 | Baum et al. |
| 5,870,393 A | 2/1999 | Yano et al. |
| 5,887,023 A | 3/1999 | Mabuchi |
| 5,907,585 A | 5/1999 | Suzuki et al. |
| 5,920,571 A | 7/1999 | Houck et al. |
| 5,926,470 A | 7/1999 | Tiedemann, Jr. |
| 5,933,421 A | 8/1999 | Alamouti et al. |
| 5,949,814 A | 9/1999 | Odenwalder et al. |
| 5,953,325 A | 9/1999 | Willars |
| 5,955,992 A | 9/1999 | Shattil |
| 5,956,642 A | 9/1999 | Larsson et al. |
| 5,995,992 A | 11/1999 | Eckard |
| 5,999,826 A | 12/1999 | Whinnett |
| 6,002,942 A | 12/1999 | Park |
| 6,016,123 A | 1/2000 | Barton et al. |
| 6,038,150 A | 3/2000 | Yee et al. |
| 6,038,263 A | 3/2000 | Kotzin et al. |
| 6,038,450 A | 3/2000 | Brink et al. |
| 6,052,364 A | 4/2000 | Chalmers et al. |
| 6,061,337 A | 5/2000 | Light et al. |
| 6,067,315 A | 5/2000 | Sandin |
| 6,075,350 A | 6/2000 | Peng |
| 6,075,797 A | 6/2000 | Thomas |
| 6,076,114 A | 6/2000 | Wesley |
| 6,088,345 A | 7/2000 | Sakoda et al. |
| 6,088,592 A | 7/2000 | Doner et al. |
| 6,108,323 A | 8/2000 | Gray |
| 6,108,550 A | 8/2000 | Wiorek et al. |
| 6,112,094 A | 8/2000 | Dent |
| 6,128,776 A | 10/2000 | Kang |
| 6,138,037 A | 10/2000 | Jaamies |
| 6,141,317 A | 10/2000 | Marchok et al. |
| 6,154,484 A | 11/2000 | Lee et al. |
| 6,169,910 B1 | 1/2001 | Tamil et al. |
| 6,172,993 B1 | 1/2001 | Kim et al. |
| 6,175,550 B1 | 1/2001 | Van Nee |
| 6,175,650 B1 | 1/2001 | Sindhu et al. |
| 6,176,550 B1 | 1/2001 | Lamart et al. |
| 6,198,775 B1 | 3/2001 | Khayrallah et al. |
| 6,215,983 B1 | 4/2001 | Dogan et al. |
| 6,226,280 B1 | 5/2001 | Roark et al. |
| 6,232,918 B1 | 5/2001 | Wax et al. |
| 6,240,129 B1 | 5/2001 | Reusens et al. |
| 6,249,683 B1 | 6/2001 | Lundby et al. |
| 6,256,478 B1 | 7/2001 | Allen et al. |
| 6,271,946 B1 | 8/2001 | Chang et al. |
| 6,272,122 B1 | 8/2001 | Wee |
| 6,310,704 B1 | 10/2001 | Dogan et al. |
| 6,317,435 B1 | 11/2001 | Tiedemann, Jr. et al. |
| 6,335,922 B1 | 1/2002 | Tiedemann, Jr. et al. |
| 6,337,659 B1 | 1/2002 | Kim |
| 6,337,983 B1 | 1/2002 | Bonta et al. |
| 6,353,637 B1 | 3/2002 | Mansour et al. |
| 6,363,060 B1 | 3/2002 | Sarkar |
| 6,374,115 B1 | 4/2002 | Barnes et al. |
| 6,377,539 B1 | 4/2002 | Kang et al. |
| 6,377,809 B1 | 4/2002 | Rezaiifar et al. |
| 6,388,998 B1 | 5/2002 | Kasturia |
| 6,393,008 B1 | 5/2002 | Cheng et al. |
| 6,393,012 B1 | 5/2002 | Pankaj |
| 6,401,062 B1 | 6/2002 | Murashima |
| 6,438,369 B1 | 8/2002 | Huang et al. |
| 6,449,246 B1 | 9/2002 | Barton et al. |
| 6,466,800 B1 | 10/2002 | Sydon et al. |
| 6,473,467 B1 | 10/2002 | Wallace et al. |
| 6,477,317 B1 | 11/2002 | Itokawa |
| 6,478,422 B1 | 11/2002 | Hansen |
| 6,483,820 B1 | 11/2002 | Davidson et al. |
| 6,487,243 B1 | 11/2002 | Hwang et al. |
| 6,496,790 B1 | 12/2002 | Kathavate et al. |
| 6,501,810 B1 | 12/2002 | Karim et al. |
| 6,507,601 B2 | 1/2003 | Parsa et al. |
| 6,519,462 B1 | 2/2003 | Lu et al. |
| 6,529,525 B1 | 3/2003 | Pecen et al. |
| 6,535,666 B1 | 3/2003 | Dogan et al. |
| 6,539,008 B1 | 3/2003 | Ahn et al. |
| 6,539,213 B1 | 3/2003 | Richards et al. |
| 6,542,485 B1 | 4/2003 | Mujtaba |
| 6,542,743 B1 | 4/2003 | Soliman |
| 6,563,806 B1 | 5/2003 | Yano et al. |
| 6,563,881 B1 | 5/2003 | Sakoda et al. |
| 6,577,739 B1 | 6/2003 | Hurtig et al. |
| 6,584,140 B1 | 6/2003 | Lee |
| 6,590,881 B1 | 7/2003 | Wallace et al. |
| 6,597,746 B1 | 7/2003 | Amrany et al. |
| 6,601,206 B1 | 7/2003 | Marvasti |
| 6,614,857 B1 | 9/2003 | Buehrer et al. |
| 6,625,172 B2 | 9/2003 | Odenwalder et al. |
| 6,636,568 B2 | 10/2003 | Kadous |
| 6,654,339 B1 | 11/2003 | Bohnke et al. |
| 6,654,431 B1 | 11/2003 | Barton et al. |
| 6,657,949 B1 | 12/2003 | Jones, IV et al. |
| 6,658,258 B1 | 12/2003 | Chen et al. |
| 6,674,787 B1 | 1/2004 | Dick et al. |
| 6,674,810 B1 | 1/2004 | Cheng |
| 6,675,012 B2 | 1/2004 | Gray |
| 6,678,318 B1 | 1/2004 | Lai |
| 6,690,951 B1 | 2/2004 | Cuffaro et al. |
| 6,693,952 B1 | 2/2004 | Chuah et al. |
| 6,701,165 B1 | 3/2004 | Ho et al. |
| 6,704,571 B1 | 3/2004 | Moon |
| 6,711,400 B1 | 3/2004 | Aura |
| 6,717,908 B2 | 4/2004 | Vijayan et al. |
| 6,721,568 B1 | 4/2004 | Gustavsson et al. |
| 6,724,719 B1 | 4/2004 | Tong et al. |
| 6,731,602 B1 | 5/2004 | Watanabe et al. |
| 6,735,244 B1 | 5/2004 | Hasegawa et al. |
| 6,744,743 B2 | 6/2004 | Walton et al. |
| 6,748,220 B1 | 6/2004 | Chow et al. |
| 6,751,444 B1 | 6/2004 | Meiyappan |
| 6,751,456 B2 | 6/2004 | Bilgic |
| 6,754,511 B1 | 6/2004 | Halford et al. |
| 6,763,009 B1 | 7/2004 | Bedekar et al. |
| 6,765,969 B1 | 7/2004 | Vook et al. |
| 6,776,165 B2 | 8/2004 | Jin |
| 6,776,765 B2 | 8/2004 | Soukup et al. |
| 6,778,513 B2 | 8/2004 | Kasapi et al. |
| 6,785,341 B2 | 8/2004 | Walton et al. |
| 6,798,736 B1 | 9/2004 | Black et al. |

(56) References Cited

U.S. PATENT DOCUMENTS

| | | |
|---|---|---|
| 6,799,043 B2 | 9/2004 | Tiedemann, Jr. et al. |
| 6,802,035 B2 | 10/2004 | Catreux et al. |
| 6,804,307 B1 | 10/2004 | Popovic |
| 6,813,284 B2 | 11/2004 | Vayanos et al. |
| 6,821,535 B2 | 11/2004 | Nurmi et al. |
| 6,828,293 B1 | 12/2004 | Hazenkamp et al. |
| 6,829,293 B2 | 12/2004 | Jones et al. |
| 6,831,943 B1 | 12/2004 | Dabak et al. |
| 6,842,487 B1 | 1/2005 | Larsson |
| 6,850,481 B2 | 2/2005 | Wu et al. |
| 6,850,509 B2 | 2/2005 | Lee et al. |
| 6,862,271 B2 | 3/2005 | Medvedev et al. |
| 6,870,808 B1 | 3/2005 | Liu et al. |
| 6,870,826 B1 | 3/2005 | Ishizu |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,909,707 B2 | 6/2005 | Rotstein et al. |
| 6,909,797 B2 | 6/2005 | Romsdahl et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia |
| 6,934,266 B2 | 8/2005 | Dulin et al. |
| 6,934,275 B1 | 8/2005 | Love et al. |
| 6,934,340 B1 | 8/2005 | Dollard |
| 6,940,827 B2 | 9/2005 | Li et al. |
| 6,940,842 B2 | 9/2005 | Proctor, Jr. |
| 6,940,845 B2 | 9/2005 | Benveniste |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B1 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 | 3/2006 | Shattil |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem |
| 7,020,110 B2 | 3/2006 | Walton et al. |
| 7,023,880 B2 | 4/2006 | El-Maleh et al. |
| 7,039,356 B2 | 5/2006 | Nguyen |
| 7,039,370 B2 | 5/2006 | Laroia et al. |
| 7,042,856 B2 | 5/2006 | Walton et al. |
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,405 B2 | 5/2006 | Attar et al. |
| 7,050,759 B2 | 5/2006 | Gaal et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,184,713 B2 | 2/2007 | Kadous et al. |
| 7,188,300 B2 | 3/2007 | Eriksson et al. |
| 7,197,282 B2 | 3/2007 | Dent et al. |
| 7,200,177 B2 | 4/2007 | Miyoshi |
| 7,209,712 B2 | 4/2007 | Holtzman |
| 7,215,979 B2 | 5/2007 | Nakagawa et al. |
| 7,230,941 B2 | 6/2007 | Odenwalder et al. |
| 7,230,942 B2 | 6/2007 | Laroia et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal |
| 7,257,167 B2 | 8/2007 | Lau |
| 7,257,406 B2 | 8/2007 | Ji |
| 7,257,423 B2 | 8/2007 | Iochi |
| 7,260,153 B2 | 8/2007 | Nissani (Nissensohn) |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,313,086 B2 | 12/2007 | Aizawa |
| 7,313,126 B2 | 12/2007 | Yun et al. |
| 7,313,174 B2 | 12/2007 | Alard et al. |
| 7,313,407 B2 | 12/2007 | Shapira |
| 7,327,812 B2 | 2/2008 | Auer |
| 7,330,701 B2 | 2/2008 | Mukkavilli et al. |
| 7,336,727 B2 | 2/2008 | Mukkavilli et al. |
| 7,349,371 B2 | 3/2008 | Schein et al. |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara |
| 7,392,014 B2 | 6/2008 | Baker et al. |
| 7,394,865 B2 | 7/2008 | Borran et al. |

(56) References Cited

U.S. PATENT DOCUMENTS

| | | |
|---|---|---|
| 7,403,745 B2 | 7/2008 | Dominique et al. |
| 7,403,748 B1 | 7/2008 | Keskitalo et al. |
| 7,406,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen |
| 7,418,043 B2 | 8/2008 | Shattil |
| 7,418,246 B2 | 8/2008 | Kim et al. |
| 7,423,991 B2 | 9/2008 | Cho et al. |
| 7,426,426 B2 | 9/2008 | Van Baren |
| 7,428,426 B2 | 9/2008 | Kiran et al. |
| 7,433,661 B2 | 10/2008 | Kogiantis et al. |
| 7,437,164 B2 | 10/2008 | Agrawal et al. |
| 7,443,835 B2 | 10/2008 | Lakshmi Narayanan et al. |
| 7,447,270 B1 | 11/2008 | Hottinen |
| 7,450,532 B2 | 11/2008 | Chae et al. |
| 7,450,548 B2 | 11/2008 | Haustein et al. |
| 7,460,466 B2 | 12/2008 | Lee et al. |
| 7,463,698 B2 | 12/2008 | Fujii et al. |
| 7,468,943 B2 | 12/2008 | Gu et al. |
| 7,469,011 B2 | 12/2008 | Lin et al. |
| 7,471,963 B2 | 12/2008 | Kim et al. |
| 7,483,408 B2 | 1/2009 | Bevan et al. |
| 7,483,719 B2 | 1/2009 | Kim et al. |
| 7,486,408 B2 | 2/2009 | Van Der Schaar et al. |
| 7,486,735 B2 | 2/2009 | Dubuc et al. |
| 7,492,788 B2 | 2/2009 | Zhang et al. |
| 7,499,393 B2 | 3/2009 | Ozluturk |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,545,867 B1 | 6/2009 | Lou et al. |
| 7,548,506 B2 | 6/2009 | Ma et al. |
| 7,551,546 B2 | 6/2009 | Ma et al. |
| 7,551,564 B2 | 6/2009 | Mattina |
| 7,558,293 B2 | 7/2009 | Choi et al. |
| 7,567,621 B2 | 7/2009 | Sampath et al. |
| 7,573,900 B2 | 8/2009 | Kim et al. |
| 7,599,327 B2 | 10/2009 | Zhuang |
| 7,616,955 B2 | 11/2009 | Kim |
| 7,623,442 B2 | 11/2009 | Laroia et al. |
| 7,627,051 B2 | 12/2009 | Shen et al. |
| 7,664,061 B2 | 2/2010 | Hottinen |
| 7,676,007 B1 | 3/2010 | Choi et al. |
| 7,684,507 B2 | 3/2010 | Levy |
| 7,724,777 B2 | 5/2010 | Sutivong et al. |
| 7,768,979 B2 | 8/2010 | Sutivong et al. |
| 7,899,497 B2 | 3/2011 | Kish et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,014,271 B2 | 9/2011 | Laroia et al. |
| 8,031,583 B2 * | 10/2011 | Classon et al. ............... 370/208 |
| 8,045,512 B2 | 10/2011 | Khandekar et al. |
| 8,095,141 B2 | 1/2012 | Teague |
| 8,098,568 B2 | 1/2012 | Laroia et al. |
| 8,098,569 B2 | 1/2012 | Laroia et al. |
| 8,199,634 B2 | 6/2012 | Laroia et al. |
| 8,218,425 B2 | 7/2012 | Laroia et al. |
| 8,223,627 B2 | 7/2012 | Laroia et al. |
| 8,295,154 B2 | 10/2012 | Laroia et al. |
| 8,446,892 B2 | 5/2013 | Ji et al. |
| 8,462,859 B2 | 6/2013 | Sampath et al. |
| 8,477,684 B2 | 7/2013 | Khandekar et al. |
| 2001/0021180 A1 | 9/2001 | Lee et al. |
| 2001/0021650 A1 | 9/2001 | Bilgic |
| 2001/0024427 A1 | 9/2001 | Suzuki |
| 2001/0030948 A1 | 10/2001 | Tiedemann, Jr. |
| 2001/0047424 A1 | 11/2001 | Alastalo et al. |
| 2001/0053140 A1 | 12/2001 | Choi et al. |
| 2001/0055293 A1 | 12/2001 | Parsa et al. |
| 2001/0055294 A1 | 12/2001 | Motoyoshi |
| 2001/0055297 A1 | 12/2001 | Benveniste |
| 2002/0000948 A1 | 1/2002 | Chun et al. |
| 2002/0003792 A1 | 1/2002 | Schmidl et al. |
| 2002/0015405 A1 | 2/2002 | Sepponen et al. |
| 2002/0018157 A1 | 2/2002 | Zhang et al. |
| 2002/0039912 A1 | 4/2002 | Yamaguchi et al. |
| 2002/0044524 A1 | 4/2002 | Laroia et al. |
| 2002/0058525 A1 | 5/2002 | Kasapi et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan |
| 2002/0101839 A1 | 8/2002 | Farley et al. |
| 2002/0122381 A1 | 9/2002 | Wu et al. |
| 2002/0122383 A1 | 9/2002 | Wu et al. |
| 2002/0122400 A1 | 9/2002 | Vayanos et al. |
| 2002/0122403 A1 | 9/2002 | Hashem et al. |
| 2002/0128035 A1 | 9/2002 | Jokinen et al. |
| 2002/0147953 A1 | 10/2002 | Catreux et al. |
| 2002/0159422 A1 | 10/2002 | Li et al. |
| 2002/0160769 A1 | 10/2002 | Gray |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0172308 A1 | 11/2002 | Harel et al. |
| 2002/0176398 A1 | 11/2002 | Nidda |
| 2002/0181571 A1 | 12/2002 | Yamano et al. |
| 2002/0191569 A1 | 12/2002 | Sung et al. |
| 2002/0193146 A1 | 12/2002 | Wallace et al. |
| 2003/0002464 A1 | 1/2003 | Rezaiifar et al. |
| 2003/0003880 A1 | 1/2003 | Ling et al. |
| 2003/0020651 A1 | 1/2003 | Crilly, Jr. et al. |
| 2003/0027579 A1 | 2/2003 | Sydon |
| 2003/0035491 A1 | 2/2003 | Walton et al. |
| 2003/0036359 A1 | 2/2003 | Dent et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072254 A1 | 4/2003 | Ma et al. |
| 2003/0072255 A1 | 4/2003 | Ma et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0073464 A1 | 4/2003 | Giannakis et al. |
| 2003/0076878 A1 | 4/2003 | Jones et al. |
| 2003/0076890 A1 | 4/2003 | Hochwald et al. |
| 2003/0086371 A1 | 5/2003 | Walton et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0109226 A1 | 6/2003 | Brunner et al. |
| 2003/0109266 A1 | 6/2003 | Rafiah et al. |
| 2003/0112745 A1 | 6/2003 | Zhuang et al. |
| 2003/0123414 A1 | 7/2003 | Tong et al. |
| 2003/0125040 A1 | 7/2003 | Walton et al. |
| 2003/0128658 A1 | 7/2003 | Walton et al. |
| 2003/0133426 A1 | 7/2003 | Schein et al. |
| 2003/0142648 A1 | 7/2003 | Semper |
| 2003/0142729 A1 | 7/2003 | Subrahmanya et al. |
| 2003/0147371 A1 | 8/2003 | Choi et al. |
| 2003/0157900 A1 | 8/2003 | Gaal et al. |
| 2003/0161281 A1 | 8/2003 | Dulin et al. |
| 2003/0161282 A1 | 8/2003 | Medvedev et al. |
| 2003/0161821 A1 | 8/2003 | Santana Ribeiro |
| 2003/0165189 A1 | 9/2003 | Kadous |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0202560 A1 | 10/2003 | Tiedemann, Jr. et al. |
| 2003/0216156 A1 | 11/2003 | Chun |
| 2003/0223452 A1 | 12/2003 | Toskala et al. |
| 2003/0228850 A1 | 12/2003 | Hwang |
| 2003/0235255 A1 | 12/2003 | Ketchum et al. |
| 2003/0236080 A1 | 12/2003 | Kadous et al. |
| 2004/0001429 A1 | 1/2004 | Ma et al. |
| 2004/0001460 A1 | 1/2004 | Bevan et al. |

(56) References Cited

U.S. PATENT DOCUMENTS

| | | | |
|---|---|---|---|
| 2004/0002364 | A1 | 1/2004 | Trikkonen et al. |
| 2004/0009783 | A1 | 1/2004 | Miyoshi |
| 2004/0010623 | A1 | 1/2004 | Sher et al. |
| 2004/0015692 | A1 | 1/2004 | Green et al. |
| 2004/0017785 | A1 | 1/2004 | Zelst |
| 2004/0032443 | A1 | 2/2004 | Moylan et al. |
| 2004/0037235 | A1 | 2/2004 | Kadous |
| 2004/0038697 | A1 | 2/2004 | Attar et al. |
| 2004/0042558 | A1 | 3/2004 | Hwang et al. |
| 2004/0048609 | A1 | 3/2004 | Kosaka |
| 2004/0048630 | A1 | 3/2004 | Shapira |
| 2004/0054999 | A1 | 3/2004 | Willen et al. |
| 2004/0057394 | A1 | 3/2004 | Holtzman |
| 2004/0058687 | A1 | 3/2004 | Kim et al. |
| 2004/0066754 | A1 | 4/2004 | Hottinen |
| 2004/0066761 | A1 | 4/2004 | Giannakis et al. |
| 2004/0066772 | A1 | 4/2004 | Moon et al. |
| 2004/0067756 | A1* | 4/2004 | Wager et al. .................. 455/450 |
| 2004/0072565 | A1 | 4/2004 | Nobukiyo et al. |
| 2004/0076185 | A1 | 4/2004 | Kim et al. |
| 2004/0077345 | A1 | 4/2004 | Turner et al. |
| 2004/0077379 | A1 | 4/2004 | Smith et al. |
| 2004/0081073 | A1 | 4/2004 | Walton et al. |
| 2004/0081195 | A1 | 4/2004 | El-Maleh et al. |
| 2004/0086055 | A1 | 5/2004 | Li |
| 2004/0087325 | A1 | 5/2004 | Cheng et al. |
| 2004/0095907 | A1 | 5/2004 | Agee et al. |
| 2004/0097215 | A1 | 5/2004 | Abe et al. |
| 2004/0097240 | A1 | 5/2004 | Chen et al. |
| 2004/0098505 | A1 | 5/2004 | Clemmensen |
| 2004/0105489 | A1 | 6/2004 | Kim et al. |
| 2004/0114618 | A1 | 6/2004 | Tong et al. |
| 2004/0120411 | A1 | 6/2004 | Walton et al. |
| 2004/0125792 | A1 | 7/2004 | Bradbury et al. |
| 2004/0128605 | A1 | 7/2004 | Sibecas et al. |
| 2004/0131007 | A1 | 7/2004 | Smee et al. |
| 2004/0131008 | A1 | 7/2004 | Zuniga et al. |
| 2004/0131038 | A1 | 7/2004 | Kim et al. |
| 2004/0131110 | A1 | 7/2004 | Alard et al. |
| 2004/0136344 | A1 | 7/2004 | Kim et al. |
| 2004/0136349 | A1 | 7/2004 | Walton et al. |
| 2004/0141548 | A1 | 7/2004 | Shattil |
| 2004/0156328 | A1 | 8/2004 | Walton et al. |
| 2004/0160914 | A1 | 8/2004 | Sarkar |
| 2004/0160933 | A1 | 8/2004 | Odenwalder et al. |
| 2004/0162083 | A1 | 8/2004 | Chen et al. |
| 2004/0165564 | A1 | 8/2004 | Kim et al. |
| 2004/0166867 | A1 | 8/2004 | Hawe |
| 2004/0166887 | A1 | 8/2004 | Laroia et al. |
| 2004/0170152 | A1 | 9/2004 | Nagao et al. |
| 2004/0170157 | A1 | 9/2004 | Kim et al. |
| 2004/0171384 | A1 | 9/2004 | Holma et al. |
| 2004/0171385 | A1 | 9/2004 | Haustein et al. |
| 2004/0178954 | A1 | 9/2004 | Vook et al. |
| 2004/0179480 | A1 | 9/2004 | Attar et al. |
| 2004/0179494 | A1 | 9/2004 | Attar et al. |
| 2004/0179506 | A1 | 9/2004 | Padovani et al. |
| 2004/0179627 | A1 | 9/2004 | Ketchum et al. |
| 2004/0181569 | A1 | 9/2004 | Attar et al. |
| 2004/0185792 | A1 | 9/2004 | Alexiou et al. |
| 2004/0190486 | A1 | 9/2004 | Oshiba |
| 2004/0190640 | A1 | 9/2004 | Dubuc et al. |
| 2004/0202257 | A1 | 10/2004 | Mehta et al. |
| 2004/0203347 | A1 | 10/2004 | Nguyen |
| 2004/0208138 | A1 | 10/2004 | Hayashi et al. |
| 2004/0218520 | A1 | 11/2004 | Aizawa |
| 2004/0219819 | A1 | 11/2004 | Di Mascio |
| 2004/0219919 | A1 | 11/2004 | Whinnett et al. |
| 2004/0224711 | A1 | 11/2004 | Panchal et al. |
| 2004/0228267 | A1 | 11/2004 | Agrawal et al. |
| 2004/0228313 | A1 | 11/2004 | Cheng et al. |
| 2004/0229615 | A1 | 11/2004 | Agrawal |
| 2004/0240419 | A1 | 12/2004 | Abrishamkar et al. |
| 2004/0240572 | A1 | 12/2004 | Brutel et al. |
| 2004/0248604 | A1 | 12/2004 | Vaidyanathan |
| 2004/0252529 | A1 | 12/2004 | Huber et al. |
| 2004/0252629 | A1 | 12/2004 | Hasegawa et al. |
| 2004/0252655 | A1 | 12/2004 | Lim et al. |
| 2004/0252662 | A1 | 12/2004 | Cho |
| 2004/0257979 | A1 | 12/2004 | Ro et al. |
| 2004/0264507 | A1 | 12/2004 | Cho et al. |
| 2004/0264585 | A1 | 12/2004 | Borran et al. |
| 2004/0264593 | A1 | 12/2004 | Shim et al. |
| 2005/0002412 | A1 | 1/2005 | Sagfors et al. |
| 2005/0002440 | A1 | 1/2005 | Alamouti et al. |
| 2005/0002467 | A1 | 1/2005 | Seo et al. |
| 2005/0002468 | A1 | 1/2005 | Walton et al. |
| 2005/0003782 | A1 | 1/2005 | Wintzell |
| 2005/0008091 | A1 | 1/2005 | Boutros et al. |
| 2005/0009486 | A1 | 1/2005 | Al-Dhahir et al. |
| 2005/0013263 | A1 | 1/2005 | Kim et al. |
| 2005/0025093 | A1 | 2/2005 | Yun et al. |
| 2005/0030886 | A1 | 2/2005 | Wu et al. |
| 2005/0030964 | A1 | 2/2005 | Tiedemann et al. |
| 2005/0034079 | A1 | 2/2005 | Gunasekar et al. |
| 2005/0041611 | A1 | 2/2005 | Sandhu |
| 2005/0041618 | A1 | 2/2005 | Wei et al. |
| 2005/0041750 | A1 | 2/2005 | Lau |
| 2005/0041775 | A1 | 2/2005 | Batzinger et al. |
| 2005/0044206 | A1 | 2/2005 | Johansson et al. |
| 2005/0047517 | A1 | 3/2005 | Georgios et al. |
| 2005/0052991 | A1 | 3/2005 | Kadous |
| 2005/0053081 | A1 | 3/2005 | Andersson et al. |
| 2005/0053151 | A1 | 3/2005 | Lin et al. |
| 2005/0063298 | A1 | 3/2005 | Ling et al. |
| 2005/0068921 | A1 | 3/2005 | Liu |
| 2005/0073973 | A1 | 4/2005 | Laroia et al. |
| 2005/0073976 | A1 | 4/2005 | Fujii |
| 2005/0075073 | A1 | 4/2005 | Kadous et al. |
| 2005/0084000 | A1 | 4/2005 | Krauss et al. |
| 2005/0085195 | A1 | 4/2005 | Tong et al. |
| 2005/0085197 | A1 | 4/2005 | Laroia et al. |
| 2005/0085236 | A1 | 4/2005 | Gerlach et al. |
| 2005/0088959 | A1 | 4/2005 | Kadous |
| 2005/0111397 | A1 | 5/2005 | Attar et al. |
| 2005/0113100 | A1 | 5/2005 | Oprescu-Surcobe et al. |
| 2005/0122898 | A1 | 6/2005 | Jang et al. |
| 2005/0128683 | A1 | 6/2005 | Watanabe et al. |
| 2005/0128983 | A1 | 6/2005 | Kim et al. |
| 2005/0135324 | A1 | 6/2005 | Kim et al. |
| 2005/0135498 | A1 | 6/2005 | Yee |
| 2005/0138671 | A1 | 6/2005 | Love et al. |
| 2005/0141624 | A1 | 6/2005 | Lakshmipathi et al. |
| 2005/0147024 | A1 | 7/2005 | Jung et al. |
| 2005/0147025 | A1 | 7/2005 | Auer |
| 2005/0152484 | A1 | 7/2005 | Sandhu et al. |
| 2005/0157807 | A1 | 7/2005 | Shim et al. |
| 2005/0159162 | A1 | 7/2005 | Park |
| 2005/0164709 | A1 | 7/2005 | Balasubramanian et al. |
| 2005/0165949 | A1 | 7/2005 | Teague |
| 2005/0174981 | A1 | 8/2005 | Heath et al. |
| 2005/0175070 | A1 | 8/2005 | Grob et al. |
| 2005/0180311 | A1 | 8/2005 | Wang et al. |
| 2005/0180313 | A1 | 8/2005 | Kim et al. |
| 2005/0181799 | A1 | 8/2005 | Laroia et al. |
| 2005/0192011 | A1 | 9/2005 | Hong et al. |
| 2005/0195733 | A1 | 9/2005 | Walton et al. |
| 2005/0195852 | A1 | 9/2005 | Vayanos et al. |
| 2005/0195886 | A1 | 9/2005 | Lampinen et al. |
| 2005/0201296 | A1 | 9/2005 | Vannithamby et al. |
| 2005/0204247 | A1 | 9/2005 | Guo et al. |
| 2005/0207367 | A1 | 9/2005 | Onggosanusi et al. |
| 2005/0215196 | A1 | 9/2005 | Krishnan et al. |
| 2005/0215251 | A1 | 9/2005 | Krishnan et al. |
| 2005/0226204 | A1 | 10/2005 | Uehara |
| 2005/0239465 | A1 | 10/2005 | Lee et al. |
| 2005/0243791 | A1 | 11/2005 | Park et al. |
| 2005/0246548 | A1 | 11/2005 | Laitinen |
| 2005/0249266 | A1 | 11/2005 | Brown et al. |
| 2005/0254416 | A1 | 11/2005 | Laroia et al. |
| 2005/0254467 | A1 | 11/2005 | Li et al. |
| 2005/0254477 | A1 | 11/2005 | Lee et al. |
| 2005/0254556 | A1 | 11/2005 | Fujii et al. |
| 2005/0259005 | A1 | 11/2005 | Chiang et al. |

(56) References Cited

U.S. PATENT DOCUMENTS

| | | |
|---|---|---|
| 2005/0259723 A1 | 11/2005 | Blanchard |
| 2005/0259757 A1 | 11/2005 | Wu et al. |
| 2005/0265220 A1 | 12/2005 | Erlich et al. |
| 2005/0265293 A1 | 12/2005 | Ro et al. |
| 2005/0265470 A1 | 12/2005 | Kishigami et al. |
| 2005/0271012 A1 | 12/2005 | Agrawal et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281029 A1 | 12/2005 | Inamoto |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0286465 A1 | 12/2005 | Zhuang |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0018347 A1 | 1/2006 | Agrawal |
| 2006/0018397 A1 | 1/2006 | Sampath et al. |
| 2006/0026344 A1 | 2/2006 | Sun Hsu et al. |
| 2006/0029289 A1 | 2/2006 | Yamaguchi et al. |
| 2006/0034163 A1 | 2/2006 | Gore et al. |
| 2006/0034164 A1 | 2/2006 | Ozluturk |
| 2006/0034173 A1 | 2/2006 | Teague et al. |
| 2006/0039332 A1 | 2/2006 | Kotzin |
| 2006/0039344 A1 | 2/2006 | Khan |
| 2006/0039500 A1 | 2/2006 | Yun et al. |
| 2006/0040655 A1 | 2/2006 | Kim |
| 2006/0045003 A1 | 3/2006 | Choi et al. |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0089104 A1 | 4/2006 | Kaikkonen et al. |
| 2006/0092054 A1 | 5/2006 | Li et al. |
| 2006/0093065 A1 | 5/2006 | Thomas et al. |
| 2006/0104333 A1 | 5/2006 | Rainbolt et al. |
| 2006/0104381 A1 | 5/2006 | Menon et al. |
| 2006/0109814 A1 | 5/2006 | Kuzminskiy et al. |
| 2006/0111054 A1 | 5/2006 | Pan et al. |
| 2006/0111148 A1 | 5/2006 | Mukkavilli et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0146867 A1 | 7/2006 | Lee et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0193294 A1 | 8/2006 | Jorswieck et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0233124 A1 | 10/2006 | Palanki |
| 2006/0233131 A1 | 10/2006 | Gore et al. |
| 2006/0233222 A1 | 10/2006 | Reial et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0280114 A1 | 12/2006 | Osseiran et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulson |
| 2007/0019596 A1 | 1/2007 | Barriac et al. |
| 2007/0025345 A1 | 2/2007 | Bachl et al. |
| 2007/0041311 A1 | 2/2007 | Baum et al. |
| 2007/0041404 A1 | 2/2007 | Palanki et al. |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0070952 A1 | 3/2007 | Yoon et al. |
| 2007/0071147 A1 | 3/2007 | Sampath et al. |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097918 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou |
| 2007/0098050 A1 | 5/2007 | Khandekar et al. |
| 2007/0098120 A1 | 5/2007 | Wang |
| 2007/0099666 A1 | 5/2007 | Astely et al. |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1 | 8/2007 | Pi et al. |
| 2007/0183386 A1 | 8/2007 | Muharemovic et al. |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhang et al. |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0095223 A1 | 4/2008 | Tong et al. |
| 2008/0095262 A1 | 4/2008 | Ho et al. |
| 2008/0151829 A1 | 6/2008 | Khandekar et al. |
| 2008/0181139 A1 | 7/2008 | Rangarajan et al. |
| 2008/0214222 A1 | 9/2008 | Atarashi et al. |
| 2008/0253279 A1 | 10/2008 | Ma et al. |
| 2008/0267157 A1 | 10/2008 | Lee et al. |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0180459 A1 | 7/2009 | Orlik et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |

(56) References Cited

U.S. PATENT DOCUMENTS

| | | |
|---|---|---|
| 2009/0213750 A1 | 8/2009 | Gorokhov et al. |
| 2009/0213950 A1 | 8/2009 | Gorokhov et al. |
| 2009/0262641 A1 | 10/2009 | Laroia et al. |
| 2009/0262699 A1 | 10/2009 | Wengerter et al. |
| 2009/0285163 A1 | 11/2009 | Zhang et al. |
| 2009/0287977 A1 | 11/2009 | Chang et al. |
| 2010/0002570 A9 | 1/2010 | Walton et al. |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0306291 A1 | 12/2011 | Ma et al. |
| 2012/0002623 A1 | 1/2012 | Khandekar et al. |
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2013/0016678 A1 | 1/2013 | Laroia et al. |
| 2013/0208681 A1 | 8/2013 | Gore et al. |
| 2013/0287138 A1 | 10/2013 | Ma et al. |
| 2013/0315200 A1 | 11/2013 | Gorokhov et al. |
| 2014/0247898 A1 | 9/2014 | Laroia et al. |

FOREIGN PATENT DOCUMENTS

| | | |
|---|---|---|
| CA | 2477536 | 9/2003 |
| CA | 2540688 | 5/2005 |
| CA | 2577369 | 3/2006 |
| CL | 19931400 | 12/1994 |
| CL | 8461997 | 1/1998 |
| CL | 009531997 | 1/1998 |
| CL | 27102004 | 8/2005 |
| CL | 22892004 | 9/2005 |
| CL | 30862004 | 10/2005 |
| CL | 29932005 | 5/2006 |
| CL | 15202006 | 12/2006 |
| CL | 22032006 | 2/2007 |
| CL | 15212006 | 3/2007 |
| CL | 14922006 | 4/2007 |
| CL | 14892006 | 5/2007 |
| CL | 14902006 | 5/2007 |
| CL | 29032006 | 5/2007 |
| CL | 29062006 | 5/2007 |
| CL | 29042006 | 6/2007 |
| CL | 29022006 | 7/2007 |
| CL | 29082006 | 10/2007 |
| CL | 46151 | 12/2009 |
| CL | 29012006 | 1/2010 |
| CL | 29072006 | 1/2010 |
| CN | 1252919 | 5/2000 |
| CN | 1267437 A | 9/2000 |
| CN | 1284795 | 2/2001 |
| CN | 1296682 | 5/2001 |
| CN | 1344451 A | 4/2002 |
| CN | 1346221 | 4/2002 |
| CN | 1383631 | 12/2002 |
| CN | 1386344 | 12/2002 |
| CN | 1402916 A | 3/2003 |
| CN | 1424835 | 6/2003 |
| CN | 1132474 C | 12/2003 |
| CN | 1467938 A | 1/2004 |
| CN | 1487755 A | 4/2004 |
| CN | 1520220 | 8/2004 |
| CN | 1525678 | 9/2004 |
| CN | 1636346 | 7/2005 |
| CN | 1642051 A | 7/2005 |
| CN | 1642335 A | 7/2005 |
| CN | 1647436 | 7/2005 |
| DE | 19800653 A1 | 7/1999 |
| DE | 19800953 C1 | 7/1999 |
| DE | 19957288 C1 | 5/2001 |
| DE | 10240138 | 8/2003 |
| DE | 10254384 | 6/2004 |
| EP | 0488976 | 6/1992 |
| EP | 0568291 A2 | 11/1993 |
| EP | 0740431 A1 | 10/1996 |
| EP | 0786889 A1 | 7/1997 |
| EP | 0805576 A2 | 11/1997 |
| EP | 0807989 A1 | 11/1997 |
| EP | 0844796 A2 | 5/1998 |
| EP | 0981222 A2 | 2/2000 |
| EP | 1001570 A2 | 5/2000 |
| EP | 1047209 A1 | 10/2000 |
| EP | 1061687 A1 | 12/2000 |
| EP | 1091516 A1 | 4/2001 |
| EP | 1093241 A1 | 4/2001 |
| EP | 1148673 A2 | 10/2001 |
| EP | 1180907 A2 | 2/2002 |
| EP | 1187506 A1 | 3/2002 |
| EP | 1204217 A1 | 5/2002 |
| EP | 1255369 | 11/2002 |
| EP | 1267513 | 12/2002 |
| EP | 1074099 B1 | 2/2003 |
| EP | 1286490 A2 | 2/2003 |
| EP | 1335504 A2 | 8/2003 |
| EP | 1351538 A1 | 10/2003 |
| EP | 1376920 A1 | 1/2004 |
| EP | 1392073 A1 | 2/2004 |
| EP | 1434365 A2 | 6/2004 |
| EP | 1441469 A2 | 7/2004 |
| EP | 1445873 A2 | 8/2004 |
| EP | 1465449 A1 | 10/2004 |
| EP | 1478204 A2 | 11/2004 |
| EP | 1507421 A1 | 2/2005 |
| EP | 1513356 A2 | 3/2005 |
| EP | 1531575 A2 | 5/2005 |
| EP | 1533950 A1 | 5/2005 |
| EP | 1538863 A1 | 6/2005 |
| EP | 1542488 A1 | 6/2005 |
| EP | 1601149 A2 | 11/2005 |
| EP | 1643669 A1 | 4/2006 |
| EP | 1898542 A1 | 3/2008 |
| EP | 1941693 | 7/2011 |
| FR | 2584884 | 1/1987 |
| GB | 2279540 A | 1/1995 |
| GB | 2348776 A | 10/2000 |
| GB | 2412541 | 9/2005 |
| IL | 201872 | 5/2012 |
| JP | H04111544 A | 4/1992 |
| JP | 4301931 A | 10/1992 |
| JP | H0746248 A | 2/1995 |
| JP | 7336323 A | 12/1995 |
| JP | 8116329 A | 5/1996 |
| JP | 08288927 | 11/1996 |
| JP | 9008725 A | 1/1997 |
| JP | H09501548 A | 2/1997 |
| JP | 9131342 | 5/1997 |
| JP | 9182148 A | 7/1997 |
| JP | 09214404 | 8/1997 |
| JP | 9284200 A | 10/1997 |
| JP | 10117162 | 5/1998 |
| JP | H10210000 A | 8/1998 |
| JP | 10322304 | 12/1998 |
| JP | H11168453 A | 6/1999 |
| JP | 11191756 A | 7/1999 |
| JP | 11196109 | 7/1999 |
| JP | 11508417 T | 7/1999 |
| JP | 11239155 A | 8/1999 |
| JP | 11298954 | 10/1999 |
| JP | 11331927 A | 11/1999 |
| JP | 2000102065 A | 4/2000 |
| JP | 2000184425 | 6/2000 |
| JP | 2000511750 A | 9/2000 |
| JP | 2000332724 | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |

(56) References Cited

FOREIGN PATENT DOCUMENTS

| | | |
|---|---|---|
| JP | 2001238269 | 8/2001 |
| JP | 2001245355 A | 9/2001 |
| JP | 2001249802 | 9/2001 |
| JP | 2001285927 A | 10/2001 |
| JP | 2001521698 A | 11/2001 |
| JP | 2001526012 | 12/2001 |
| JP | 2002026790 | 1/2002 |
| JP | 2002515203 T | 5/2002 |
| JP | 2002290148 A | 10/2002 |
| JP | 2002534925 A | 10/2002 |
| JP | 2002534941 | 10/2002 |
| JP | 200318054 | 1/2003 |
| JP | 2003032218 | 1/2003 |
| JP | 2003500909 | 1/2003 |
| JP | 200369472 | 3/2003 |
| JP | 2003101515 | 4/2003 |
| JP | 2003169367 A | 6/2003 |
| JP | 2003174426 | 6/2003 |
| JP | 2003199173 A | 7/2003 |
| JP | 2003520523 | 7/2003 |
| JP | 2003249907 A | 9/2003 |
| JP | 2003292667 A | 10/2003 |
| JP | 2003318857 A | 11/2003 |
| JP | 2003347985 | 12/2003 |
| JP | 2003348047 | 12/2003 |
| JP | 2003536308 A | 12/2003 |
| JP | 2004007643 A | 1/2004 |
| JP | 2004023716 | 1/2004 |
| JP | 2004048716 | 2/2004 |
| JP | 200472457 | 3/2004 |
| JP | 2004072157 A | 3/2004 |
| JP | 2004096142 | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 | 9/2004 |
| JP | 2004529524 T | 9/2004 |
| JP | 2004297276 A | 10/2004 |
| JP | 2004297370 A | 10/2004 |
| JP | 2004297756 | 10/2004 |
| JP | 2004534456 | 11/2004 |
| JP | 2004535106 A | 11/2004 |
| JP | 2005006337 | 1/2005 |
| JP | 2005020530 | 1/2005 |
| JP | 2005502218 A | 1/2005 |
| JP | 2005506757 | 3/2005 |
| JP | 2005110130 A | 4/2005 |
| JP | 2005130491 A | 5/2005 |
| JP | 2005167502 A | 6/2005 |
| JP | 2005197772 | 7/2005 |
| JP | 2005203961 | 7/2005 |
| JP | 2005521327 | 7/2005 |
| JP | 2005521358 | 7/2005 |
| JP | 2005236678 A | 9/2005 |
| JP | 2006505172 | 2/2006 |
| JP | 2006506860 A | 2/2006 |
| JP | 2006211537 A | 8/2006 |
| JP | 2006524930 A | 11/2006 |
| JP | 2007503790 | 2/2007 |
| JP | 2007519281 | 7/2007 |
| JP | 2007525043 T | 8/2007 |
| JP | 2007527127 | 9/2007 |
| JP | 2008505587 A | 2/2008 |
| JP | 2008535398 | 8/2008 |
| JP | 4188372 B2 | 11/2008 |
| JP | 2008546314 | 12/2008 |
| JP | 04694628 B2 | 6/2011 |
| KR | 0150275 B1 | 6/1998 |
| KR | 20000060428 | 10/2000 |
| KR | 100291476 B1 | 3/2001 |
| KR | 20010056333 | 4/2001 |
| KR | 20010087715 A | 9/2001 |
| KR | 20030007965 | 1/2003 |
| KR | 20030035969 A | 5/2003 |
| KR | 20040063057 | 7/2004 |
| KR | 200471652 | 8/2004 |
| KR | 20040103441 A | 12/2004 |
| KR | 20050063826 A | 6/2005 |
| KR | 100606099 | 7/2006 |
| KR | 101046824 | 6/2011 |
| RU | 95121152 | 12/1997 |
| RU | 2141168 | 11/1999 |
| RU | 2141706 C1 | 11/1999 |
| RU | 2159007 C2 | 11/2000 |
| RU | 2162275 C2 | 1/2001 |
| RU | 2183387 C2 | 6/2002 |
| RU | 2192094 | 10/2002 |
| RU | 2197778 C2 | 1/2003 |
| RU | 2201033 C2 | 3/2003 |
| RU | 2207723 C1 | 6/2003 |
| RU | 2208913 | 7/2003 |
| RU | 2210866 C2 | 8/2003 |
| RU | 2216101 C2 | 11/2003 |
| RU | 2216103 C2 | 11/2003 |
| RU | 2216105 C2 | 11/2003 |
| RU | 2225080 C2 | 2/2004 |
| RU | 2235429 | 8/2004 |
| RU | 2235432 C2 | 8/2004 |
| RU | 2237379 C2 | 9/2004 |
| RU | 2238611 C1 | 10/2004 |
| RU | 2292655 | 10/2004 |
| RU | 2242091 C2 | 12/2004 |
| RU | 2003125268 | 2/2005 |
| RU | 2285388 | 3/2005 |
| RU | 2250564 | 4/2005 |
| RU | 2257008 | 7/2005 |
| RU | 2267224 | 12/2005 |
| RU | 2005129079 A | 2/2006 |
| RU | 2285338 C2 | 10/2006 |
| RU | 2285351 C2 | 10/2006 |
| RU | 2335864 C2 | 10/2008 |
| RU | 2349043 C2 | 3/2009 |
| SU | 1320883 | 6/1987 |
| TW | 508960 | 11/2002 |
| TW | 510132 | 11/2002 |
| TW | 200302642 | 8/2003 |
| TW | 200401572 | 1/2004 |
| TW | I232040 | 5/2005 |
| TW | 248266 | 1/2006 |
| TW | I269549 | 12/2006 |
| TW | 200718128 | 5/2007 |
| WO | WO9408432 | 4/1994 |
| WO | WO9521494 | 8/1995 |
| WO | WO9613920 A1 | 5/1996 |
| WO | WO9701256 | 1/1997 |
| WO | WO9737456 A2 | 10/1997 |
| WO | WO9746033 A2 | 12/1997 |
| WO | WO9800946 | 1/1998 |
| WO | WO98014026 | 4/1998 |
| WO | WO9837706 A2 | 8/1998 |
| WO | 9848581 A1 | 10/1998 |
| WO | WO9853561 | 11/1998 |
| WO | WO9854919 A2 | 12/1998 |
| WO | WO9941871 A1 | 8/1999 |
| WO | WO9944313 | 9/1999 |
| WO | WO9944383 A1 | 9/1999 |
| WO | WO9952250 A1 | 10/1999 |
| WO | WO9953713 | 10/1999 |
| WO | WO9959265 | 11/1999 |
| WO | WO9960729 A1 | 11/1999 |
| WO | 0004728 | 1/2000 |
| WO | WO0002397 | 1/2000 |
| WO | WO0033503 | 6/2000 |
| WO | WO0070897 | 11/2000 |
| WO | WO0101596 | 1/2001 |
| WO | WO 0117125 A1 | 3/2001 |
| WO | WO 0126269 | 4/2001 |
| WO | WO 0139523 A2 | 5/2001 |
| WO | WO0145300 | 6/2001 |

(56) References Cited

FOREIGN PATENT DOCUMENTS

| | | |
|---|---|---|
| WO | WO 0148969 A2 | 7/2001 |
| WO | WO 0158054 A1 | 8/2001 |
| WO | WO 01060106 | 8/2001 |
| WO | 0165637 A2 | 9/2001 |
| WO | 0169814 A1 | 9/2001 |
| WO | WO 0182543 | 11/2001 |
| WO | WO 0182544 A2 | 11/2001 |
| WO | WO 0189112 A1 | 11/2001 |
| WO | 0195427 A2 | 12/2001 |
| WO | WO0193505 | 12/2001 |
| WO | WO 0204936 A1 | 1/2002 |
| WO | WO0207375 | 1/2002 |
| WO | WO0215616 | 2/2002 |
| WO | WO0219746 A1 | 3/2002 |
| WO | WO0231991 | 4/2002 |
| WO | WO0233848 A2 | 4/2002 |
| WO | 0245293 A2 | 6/2002 |
| WO | 0245456 A1 | 6/2002 |
| WO | WO 0249305 A2 | 6/2002 |
| WO | WO0249306 A2 | 6/2002 |
| WO | WO0249385 A2 | 6/2002 |
| WO | WO 02060138 | 8/2002 |
| WO | 02082689 A2 | 10/2002 |
| WO | WO 02082743 A2 | 10/2002 |
| WO | WO 02093782 A1 | 11/2002 |
| WO | WO02093819 A1 | 11/2002 |
| WO | WO02100027 A1 | 12/2002 |
| WO | WO03001696 A2 | 1/2003 |
| WO | WO03001761 A1 | 1/2003 |
| WO | WO03001981 A2 | 1/2003 |
| WO | WO03003617 | 1/2003 |
| WO | WO03019819 | 3/2003 |
| WO | 03034644 A1 | 4/2003 |
| WO | WO03030414 | 4/2003 |
| WO | WO03043262 | 5/2003 |
| WO | WO03043369 | 5/2003 |
| WO | 03049409 A2 | 6/2003 |
| WO | WO03058871 A1 | 7/2003 |
| WO | 03069816 A2 | 8/2003 |
| WO | WO03067783 | 8/2003 |
| WO | WO03069832 A1 | 8/2003 |
| WO | WO03073646 | 9/2003 |
| WO | WO03075479 | 9/2003 |
| WO | 03088538 A1 | 10/2003 |
| WO | WO03085876 | 10/2003 |
| WO | WO03094384 | 11/2003 |
| WO | WO03103331 | 12/2003 |
| WO | WO2004002047 | 12/2003 |
| WO | WO2004004370 | 1/2004 |
| WO | WO2004008671 | 1/2004 |
| WO | WO2004008681 A1 | 1/2004 |
| WO | WO2004015912 | 2/2004 |
| WO | WO2004016007 | 2/2004 |
| WO | 2004023834 A1 | 3/2004 |
| WO | WO2004021605 A1 | 3/2004 |
| WO | 2004028037 A1 | 4/2004 |
| WO | WO2004030238 A1 | 4/2004 |
| WO | WO2004032443 A1 | 4/2004 |
| WO | 2004038984 A2 | 5/2004 |
| WO | WO2004038954 | 5/2004 |
| WO | WO2004038972 A1 | 5/2004 |
| WO | WO2004038988 | 5/2004 |
| WO | WO2004040690 A2 | 5/2004 |
| WO | WO2004040827 | 5/2004 |
| WO | WO2004047354 | 6/2004 |
| WO | WO2004049618 A1 | 6/2004 |
| WO | WO2004051872 A2 | 6/2004 |
| WO | 2004056022 A2 | 7/2004 |
| WO | WO2004062255 | 7/2004 |
| WO | WO2004064294 | 7/2004 |
| WO | WO2004064295 | 7/2004 |
| WO | WO2004066520 | 8/2004 |
| WO | WO2004068721 A2 | 8/2004 |
| WO | WO2004073276 | 8/2004 |
| WO | 2004077850 A2 | 9/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004084509 | 9/2004 |
| WO | WO2004086706 A1 | 10/2004 |
| WO | WO2004086711 | 10/2004 |
| WO | WO2004095730 A1 | 11/2004 |
| WO | WO2004095851 | 11/2004 |
| WO | WO2004095854 | 11/2004 |
| WO | WO2004098072 A2 | 11/2004 |
| WO | WO2004098222 | 11/2004 |
| WO | WO2004102815 | 11/2004 |
| WO | WO2004102816 A2 | 11/2004 |
| WO | 2004105272 A1 | 12/2004 |
| WO | 2004114564 A1 | 12/2004 |
| WO | 2004114615 A1 | 12/2004 |
| WO | WO2004114549 | 12/2004 |
| WO | WO2005002253 A1 | 1/2005 |
| WO | 2005011163 A1 | 2/2005 |
| WO | WO2005015795 A1 | 2/2005 |
| WO | WO2005015797 | 2/2005 |
| WO | WO2005015810 | 2/2005 |
| WO | WO2005015941 | 2/2005 |
| WO | 2005025110 A2 | 3/2005 |
| WO | WO2005020488 A1 | 3/2005 |
| WO | WO2005020490 | 3/2005 |
| WO | WO2005022811 A2 | 3/2005 |
| WO | 2005032004 A1 | 4/2005 |
| WO | WO2005043855 | 5/2005 |
| WO | WO2005046080 | 5/2005 |
| WO | 2005055465 A1 | 6/2005 |
| WO | 2005055484 A1 | 6/2005 |
| WO | WO2005055527 | 6/2005 |
| WO | WO2005060192 A1 | 6/2005 |
| WO | WO2005065062 A2 | 7/2005 |
| WO | WO2005069538 A1 | 7/2005 |
| WO | WO2005074184 | 8/2005 |
| WO | 2005086440 A1 | 9/2005 |
| WO | WO2005096538 | 10/2005 |
| WO | WO2005122628 | 12/2005 |
| WO | 2006007292 A2 | 1/2006 |
| WO | WO2006019710 | 2/2006 |
| WO | WO2006026344 | 3/2006 |
| WO | WO2006044487 | 4/2006 |
| WO | 2006062356 A1 | 6/2006 |
| WO | WO2006069300 | 6/2006 |
| WO | WO2006069397 | 6/2006 |
| WO | WO2006077696 | 7/2006 |
| WO | WO2006096784 A1 | 9/2006 |
| WO | WO2006099349 A1 | 9/2006 |
| WO | WO2006099545 A1 | 9/2006 |
| WO | WO2006099577 A1 | 9/2006 |
| WO | WO2006127544 A2 | 11/2006 |
| WO | WO2006134032 | 12/2006 |
| WO | WO2006138196 | 12/2006 |
| WO | WO2006138573 | 12/2006 |
| WO | WO2006138581 A2 | 12/2006 |
| WO | 2007022430 A2 | 2/2007 |
| WO | WO2007024934 | 3/2007 |
| WO | WO2007024935 | 3/2007 |
| WO | WO2007025160 | 3/2007 |
| WO | WO2007051159 | 5/2007 |

OTHER PUBLICATIONS

3rd Generation Partnership Project; Technical Specification Group Radio Access Network; Physical Layer Aspects for Evolved UTRA (Release 7), 3GPP TR 25.814 v0.3.1 (Nov. 2005).

A. Gorokhov. "CDM/TDM control channel," Aug. 2004.

A. Khandekar. "Packet Format Concept Review," Sep. 2004.

Bahai, Saltzberg: "System Architecture," Multi-Carrier Digital Communications, Kluwer Academic, New York, NY, XP-002199501, 1999, pp. 17-21.

Bingham: "Other Types of MCM," ADSL, VDSL, and Multicarrier Modulation, John Wiley & Sons, New York, XP-002199502. 2000, pp. 111-113.

(56) References Cited

OTHER PUBLICATIONS

Blum, R. et al., "On Optimum MIMO with Antenna Selection," IEEE International Conference on Communications: Conference Proceedings, vol. 1, Apr. 28, 2002, pp. 386-390.
Boutros et al., (US 2005/0008091); Jan. 13,2005; Sphere Decoding of Symbols Transmitted in a Telecommunication System. Globecom '04, IEEE, vol. 5 IEEE Nov. 29-Dec. 3, 2004, pp. 3068-3072.
Catreux, S. et al., "Simulation results for an interference-limited multiple input multiple output cellular system," Global Telecommunications Conference, 2000. GLOBECOM '00. IEEE. Dec. 1, 2000. vol. 2, pp. 1094-1096, http://ieeexplore.ieee.org/iel5/7153/19260/00891306.pdf?tp=&isnumber=19260&arnumber=8913063&punumber=7153.
Chennakeshu, et al. "Capacity Analysis of a TDMA-Based Slow-Frequency—Hopped Cellular System," IEEE Transaction on Vehicular Technology, vol. 45., No. 3 Aug. 996, pp. 531-542.
Chiani, et al., "Outage Evaluation for Slow Frequency-Hopping Mobile Radio Systems" IEEE Transactions on Communications, vol. 47, No. 12 Dec. 1999.
Choi, et al., "Design of the Optimum Pilot Pattern for Channel Estimation in OFDM Systems," Global Telecommunications Conference, IEEE Communications Society, Globecom, Dallas, Texas (2004), p. 3661-3665.
Chung, S. et al., "Low complexity algorithm for rate and power quantization in extended V-Blast" VTC Fall 2001. IEEE 54th. Vehicular Technology Conference Proceedings. Atlantic City, NJ, Oct. 7-11, 2001, vol. 1 of 4, pp. 910-914, Conf. 54.
Czylwik: "Comparison Between Adaptive OFDM and Single Carrier Modulation with Frequency Domain Equalization," IEEE 47th Vehicular Technology Conference, vol. 2, May 4-7, 1997, pp. 865-869.
D. Gore. "MIMO Channel Estimation Concept Review," Sep. 2004.
Dai, Y. et al., "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS.2004.1388940.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Das, Arnab, et al. "Adaptive, asynchronous incremental redundancy (A-IR) with fixed transmission time intervals TTI for HSDPA." IEEE, Personal, Indoor and Mobile Radio Communications, 2002. The 13th IEEE International Symposium on, pp. 1083-1087.
Das et al., "On the Reverse Link Interference Structure for Next Generation Cellular Systems," Global Telecommunications Conference, 2004.
Dierks, et al., "The TLS Protocol", Version 1.0, Network Working Group, Request for Comments 2246, pp. 1-80 (Jan. 1999).
Digital cellular telecommunications system (Phase 2+); Mobile radio interface layer 3 specification (GSM 04.08 version 7.7.1 Release 1998); ETSI EN 300 940 V7.7.1 (Nov. 2000), pp. 1,2,91-93.
Dinis, R. et al.: "A Multiple Access Scheme for the Uplink of Broadband Wireless Systems," Global Telecommunications Conference, 2004. Globecom '04. IEEE Dallas, TX, USA Nov. 29-Dec. 3, 2004, vol. 6, p. 3808-3812, XP010758449 Piscataway , NJ, USA, IEEE.
Don Torrieri, "Cellular Frequency-Hopping CDMA Systems," IEEE Vehicular Technology Conference, May 16, 1999, pp. 919-925, vol. 2.
El Gamal, H. et al., "Universal Space-Time Coding," IEEE Transactions on Information Theory, vol. 49, Issue 5, pp. 1097-1119, XP011074756, ISSN: 0018-9448, May 2003.
European Search Report—EP07025189, Search Authority—Munich Patent Office, Mar. 6, 2008.
European Search Report—EP08012608 Search Authority—Munich Patent Office, Sep. 3, 2008.
European Search Report—EP09169034—European Search Authority—Berlin—Oct. 20, 2009.
European Search Report—EP10008766, Search Authority—Berlin Patent Office, Oct. 28, 2010.
European Search Report—EP10008767, Search Authority—Berlin Patent Office, Sep. 24, 2010.
European Search Report—EP10010615—Search Authority—Munich—Feb. 2, 2011.
European Search Report—EP10011743, Search Authority—Munich Patent Office, Dec. 20, 2010.
European Search Report—EP10012081, Search Authority—Munich Patent Office, Dec. 17, 2010.
European Search Report—EP10012082, Search Authority—Munich Patent Office, Dec. 20, 2010.
European Search Report—EP10012083, Search Authority—Munich Patent Office, Dec. 30, 2010.
European Search Report—EP11007140—Search Authority—Munich—Oct. 28, 2011.
Favre et al: "Self-Adaptive Transmission Procedure" IBM Technical Disclosure Bulletin, IBM Corporation, Sep. 1976, vol. 19, No. 4, pp. 1283-1284, New York, New York.
Fuchs, et al., "A Novel Tree-Based Scheduling Algorithm for the Downlink of Multi-User MIMO Systems with ZF Beamforming," IEEE International Conference on Acoustics, Speech, and Signal Processing, Philadelphia, pp. 1121-1124, Mar. 18-23, 2005.
Gallager, Robert "Information Theory and Reliable Communication" John Wiley and Sons, Inc. (1968).
Groe, J., et al., "CDMA Mobile Radio Design," Sep. 26, 2001, Artech House, Inc. Norwood, MA, pp. 257-259.
Guo, K. Et al., "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
H. Sampath et al. "A Fourth Generation MIMO-OFDM Broadband Wireless System: Design, Performance and Field Trial Results", IEEE Communications Magazine, pp. 143-149, Sep. 2002.
Hermann Rohling et al., : "Performance Comparison of Different Multiple Access Schemes for the Downlink of an OFDM Communication System", Vehicular Technology Conference, 1997, 47th IEEE, vol. 3, May 3-7, 1997, pp. 1365-1369.
Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, pp. 1256-1259.
Hochwald, B. et al., "Achieving near-capacity on a multiple-antenna channel," IEEE Transactions on Communications, IEEE Service Center, Piscataway, New Jersey, vol. 51, No. 3, pp. 389-399 (2003).
Hochwald et al., (US 2003/0076890); Apr.24, 2003; Method and Apparatus for Detection and Decoding of Signals Received From a Linear Propagation Channel.
Hui Won Je et al, "A Novel Multiple Access Scheme for Uplink Cellular Systems," Vehicular Technology Conference, 2004, VTC2004-fall, 2004 IEEE 60th Los Angeles, CA, US, Sep. 26-29, 2004, Piscataway, NY, pp. 984-988.
International Preliminary Exam Report—PCT/US01/028315, International Preliminary Examining Authority—US, Apr. 11, 2003.
International Preliminary Examination Report PCT/US01/028314, IPEA/US Apr. 23, 2003.
International Preliminary Report on Patentability—PCT/US06/009707—The International Bureau of WIPO—Geneva, Switzerland—Sep. 18, 2007.
International Preliminary Report on Patentability—PCT/US06/009708—The International Bureau of WIPO—Geneva, Switzerland—Sep. 18, 2007.
International Preliminary Report on Patentability—PCT/US06/009757, The International Bureau of WIPO—Geneva, Switzerland, Sep. 18, 2007.
International Preliminary Report on Patentability—PCT/US06/012229—International Bureau of WIPO—Geneva, Switzerland, Oct. 3, 2007.
International Preliminary Report on Patentability—PCT/US06/014878, The International Bureau of WIPO—Geneva, Switzerland, Oct. 23, 2007.
International Preliminary Report on Patentability—PCT/US06/014879, The International Bureau of WIPO—Geneva, Switzerland, Oct. 23, 2007.

(56) References Cited

OTHER PUBLICATIONS

International Preliminary Report on Patentability—PCT/US06/021211, International Bureau of WIPO—Geneva, Switzerland, Dec. 6, 2007.
International Preliminary Report on Patentability—PCT/US06/021379—The International Bureau of WIPO, Geneva, Switzerland—Dec. 6, 2007.
International Preliminary Report on Patentability—PCT/US06/023095—The International Bureau of WIPO, Geneva, Switzerland—Dec. 17, 2007.
International Preliminary Report on Patentability—PCT/US06/023514, International Bureau of WIPO, Dec. 17, 2007.
International Preliminary Report on Patentability—PCT/US06/032900—The International Bureau of WIPO, Geneva, Switzerland—Feb. 26, 2008.
International Preliminary Report on Patentability—PCT/US06/032901, The Internation Bureau of WIPO, Geneva, Switzerland—Feb. 26, 2008.
International Preliminary Report on Patentability—PCT/US06/033269—The International Bureau of WIPO, Geneva, Switzerland—Feb. 26, 2008.
International Preliminary Report on Patentability—PCT/US06/033801—International Bureau of WIPO, Geneva, Switzerland, Mar. 4, 2008.
International Preliminary Report on Patentability—PCT/US06/033937, The International Bureau of WIPO—Geneva, Switzerland, Mar. 4, 2008.
International Preliminary Report on Patentability—PCT/US06/060291, International Bureau of WIPO—Geneva, Switzerland, Apr. 29, 2008.
International Preliminary Report on Patentability—PCT/US06/060292, International Bureau of WIPO—Geneva, Switzerland, Apr. 29, 2008.
International Preliminary Report on Patentability—PCT/US06/060327, The International Bureau of WIPO—Geneva, Switzerland, Apr. 29, 2008.
International Preliminary Report on Patentability—PCT/US06/060328, The International Bureau of WIPO—Geneva, Switzerland—Apr. 29, 2008.
International Preliminary Report on Patentability—PCT/US06/060332, International Bureau of WIPO—Geneva, Switzerland, Apr. 29, 2008.
International Preliminary Report on Patentability—PCT/US06/060333—International Bureau of WIPO—Geneva, Switzerland, Apr. 29, 2008.
International Preliminary Report on Patentability—PCT/US06/060336—The International Bureau of WIPO—Geneva, Switzerland—Apr. 29, 2008.
International Preliminary Report on Patentability—PCT/US06/061061, The International Bureau of WIPO—Geneva, Switzerland, May 29, 2008.
International Preliminary Report on Patentability—PCT/US07/060195—International Bureau of WIPO, Geneva, Switzerland, Jul. 8, 2008.
International Preliminary Report on Patentability, PCT/US05/024614, IPEA, US—Oct. 27, 2006.
International Preliminary Report on Patentability—PCT/US06/060340, International Bureau of WIPO, Geneva Switzerland—Apr. 29, 2008.
International Preliminary Report on Patentability—PCT/US06/008986, International Bureau of WIPO, Geneva Switzerland Sep. 12, 2007.
International Preliminary Report on Patentability—PCT/US06/008987, International Bureau of WIPO, Geneva Switzerland—Sep. 12, 2007.
International Preliminary Report on Patentability—PCT/US06/060341, International Bureau of WIPO, Apr. 29, 2008.
International Preliminary Report on Patentability—PCT/US2006/010962, International Bureau of WIPO—Oct. 4, 2007.
International Preliminary Report on Patentability—PCT/US2006/060286, International Bureau of WIPO, Apr. 29, 2008.
International Preliminary Report on Patentability—PCT/US2006/060287, International Bureau of WIPO—Apr. 29, 2008.
International Search Report—PCT/US2001/028314, International Search Authority—European Patent Office, Jun. 5, 2002.
International Search Report—PCT/US01/028315, International Search Authority—European Patent Office, Jun. 21, 2002.
International Search Report—PCT/US06/014878, International Search Authority—European Patent Office, Aug. 25, 2006.
International Search Report—PCT/US06/021379—International Search Authority, European Patent Office—Oct. 16, 2006.
International Search Report—PCT/US06/023095—International Search Authority, European Patent Office—Oct. 10, 2006.
International Search Report—PCT/US06/023514, International Search Authority—ISA/US, Oct. 5, 2007.
International Search Report—PCT/US06/032860, International Search Authority—European Patent Office, Dec. 29, 2006.
International Search Report—PCT/US06/032900, International Search Authority—European Patent Office, May 3, 2007.
International Search Report—PCT/US06/060291, International Search Authority—European Patent Office—May 3, 2007.
International Search Report—PCT/US06/060327—International Search Authority, European Patent Office, Mar. 1, 2007.
International Search Report—PCT/US06/060333, International Search Authority—European Patent Office, Apr. 4, 2007.
International Search Report and Written Opinion—PCT/US06/003947, International Search Authority—European Patent Office, Jun. 12, 2006.
International Search Report and Written Opinion—PCT/US06/008986, International Search Authority—European Patent Office, Sep. 1, 2006.
International Search Report and Written Opinion—PCT/US06/008987, International Search Authority—European Patent Office, Sep. 1, 2006.
International Search Report and Written Opinion—PCT/US06/009707, International Search Authority—European Patent Office, Aug. 16, 2006.
International Search Report and Written Opinion—PCT/US06/009708, International Search Authority—European Patent Office, Sep. 19, 2006.
International Search Report and Written Opinion—PCT/US06/009757, International Search Authority—European Patent Office, Jul. 26, 2006.
International Search Report and Written Opinion—PCT/US06/012229, International Search Authority—European Patent Office, Jul. 18, 2006.
International Search Report and Written Opinion—PCT/US06/014879, International Search Authority—European Patent Office, Jan. 15, 2007.
International Search Report and Written Opinion—PCT/US06/021211, International Search Authority—European Patent Office, Sep. 25, 2006.
International Search Report and Written Opinion—PCT/US06/023514, International Search Authority—European Patent Office, Oct. 5, 2007.
International Search Report and Written Opinion—PCT/US06/031147, International Search Authority—European Patent Office, Feb. 2, 2007.
International Search Report and Written Opinion—PCT/US06/032901, International Search Authority—European Patent Office, Mar. 23, 2007.
International Search Report and Written Opinion—PCT/US06/033269, International Search Authority—European Patent Office, Feb. 22, 2007.
International Search Report and Written Opinion—PCT/US06/033801, International Search Authority—European Patent Office, Feb. 21, 2007.
International Search Report and Written Opinion—PCT/US06/033937, International Search Authority—European Patent Office, Apr. 12, 2007.

(56) References Cited

OTHER PUBLICATIONS

International Search Report and Written Opinion—PCT/US06/060286, International Search Authority—European Patent Office, May 2, 2007.
International Search Report and Written Opinion—PCT/US06/060292, International Search Authority—European Patent Office, Apr. 20, 2007.
International Search Report and Written Opinion—PCT/US06/060328, International Search Authority—European Patent Office, Mar. 30, 2007.
International Search Report and Written Opinion—PCT/US06/060332, International Search Authority—European Patent Office, Apr. 19, 2007.
International Search Report and Written Opinion—PCT/US06/060336, International Search Authority—European Patent Office, Mar. 2, 2007.
International Search Report and Written Opinion—PCT/US06/060340, International Search Authority—European Patent Office, Jun. 28, 2007.
International Search Report and Written Opinion—PCT/US06/060341, International Search Authority—European Patent Office, May 8, 2007.
International Search Report and Written Opinion—PCT/US06/061061, International Search Authority—European Patent Office, Feb. 20, 2008.
International Search Report and Written Opinion—PCT/US07/060195, International Search Authority—European Patent Office, Dec. 6, 2007.
International Search Report and Written Opinion—PCT/US07/086197, International Search Authority—European Patent Office, Jul. 21, 2008.
International Search Report and Written Opinion—PCT/US09/064871, International Searching Authority—European Patent Office, Feb. 17, 2010.
International Search Report, PCT/US05/024614, International Search Authority, European Patent Office—Oct. 20, 2005.
International Search Report—PCT/US2006/010962, International Search Authority—European Patent Office—Aug. 4, 2006.
International Search Report—PCT/US2006/060287, International Search Authority—European Patent Office—May 9, 2007.
"Introduction to cdma2000 Standards for Spread Spectrum Systems",TIA/EIA/IS-2000 Standards for CDMA2000 Spread Spectrum Systems 3GPP2 C.S0001-0 Version 1.0, Jul. 1999.
John B. Groe, Lawrence E. Larson, "CDMA Mobile Radio Design" Sep. 26, 2001, Artech House, Norwood, MA02062 580530, XP002397967, pp. 157-159.
J.S. Chow and J.M. Cioffi: "A cost-effective maximum likelihood reciever for multicarrier systems", Proc. IEEE Int. Conf. on Comm., pp. 948-952, Jun. 1992.
Kaleh: "Channel Equalization for Block Transmission Systems," IEEE Journal on Selected Areas in Communications, vol. 13, No. 1, Jan. 1995, pp. 110-121.
Kappes, J.M., and Sayegh, S.I., "Programmable Demultiplexer/Demodulator Processor," COMSAT Laboratories, IEEE, Mar. 11, 1990, pp. 230-234.
Karsten Bruninghaus et al., : "Multi-Carrier Spread Spectrum and Its relationship to Single-Carrier Transmission", Vehicular technology Conference, 1998, VTC 98, 48th IEEE, vol. 3, 18-21 May 1998, pp. 2329-2332.
Keller, et al.: "Adaptive Multicarrier Modulation: A Convenient Framework for Time-Frequency Processing in Wireless Communications," Proceedings of the IEEE, vol. 88, No. 5, May 2000, pp. 611-640.
Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kim, et al. "Performance of TDMA System With SFH and 2-Bit Differentially Detected Gmsk Over Rayleigh Fading Channel," IEEE Vehicular Technology Conference, Apr. 28, 1996, pp. 789-793.
Kishiyama et al., Investigation of optimum pilot channel structure for VSF-OFCDM broadband wireless access in forward link, VTC 2003-Spring, The 57th IEEE Semiannual Vehicular Technology Conference, Proceedings Jeju, Korea, Apr. 22-25, 2003, pp. 139-144.
Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.
Kostic, et al. "Fundamentals of Dynamic Frequency Hopping in Cellular Systems," IEEE Journal on Selected Areas in Communications, Vol. 19, No. 11, Nov. 2001, pp. 2254-2266.
Kousa, M. et al., "Adaptive Binary Coding for Diversity Communication Systems" IEEE International Conference on Personal Wireless Communications Proceedings, pp. 80-84, XP000992269, (1997).
Lacroix, et al.: "A Study of OFDM Parameters for High Data Rate Radio LAN's," 2000 IEEE 51st Vehicular Technology Conference Proceedings, vol. 2, May 15-18, 2000, pp. 1075-1079.
Laroia, R. et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.
Lau, et al., "On the Design of MIMO Block-Fading Channels with Feedback-Link Capacity Constraint," IEEE Transactions on Communications, IEEE Service Center, Piscataway, NJ, US, v. 52, No. 1, Jan. 2004, pp. 62-70, XP001189908.
Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.
Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.
Lott: "Comparison of Frequency and Time Domain Differential Modulation in an OFDM System for Wireless ATM," 1999 IEEE 49th Vehicular Technology Conference, vol. 2, Jul. 1999, pp. 877-883.
Maniatis, I. et al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.
Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.
Molisch, et al., MIMO systems with antenna selection, IEEE Microwave Magazine, Mar. 2004, pp. 46-56, XP002411128.
Naofal Al-Dhahir: "A Bandwidth-Optimized Reduced-Complexity Equalized Multicarrier Transceiver", IEEE Transactions on Communications, vol. 45, No. 8, Aug. 1997.
Naofal Al-Dhahir: "Optimum Finite-Length Equalization for Multicarrier Transceivers", IEEE Trans. on Comm., pp. 56-64, Jan. 1996.
Nassar et al., "Introduction of Carrier Interference to Spread Spectrum Multiple Access," Wireless Communications and Systems, 1999 Emerging Technologies Symposium, IEEE, Apr 12-13, 1999, pp. 1-5.
Natarajan, et al., "High-Performance MC-CDMA via Carrier Interferometry Codes," IEEE Transactions on Vehicular Technology, 2001, vol. 50 (issue 6).
Nokia, "Uplink Considerations for UTRA LTE", 3GPP TSG RAN WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1- 050249, 3GPP, Apr. 4, 2005, pp. 1-8.
NTT DoCoMo, et al., "Orthogonal Common Pilot Channel and Scrambling Code in Evolved UTRA Downlink," 3GPP TSG RAN WG1 #42 on LTE (Original R1-050589), R1-050704, London UK, pp. 1-8, Aug. 29-Sep. 2, 2005.
OFDMA Phase II High Level Design, Jan 2004.
Prasad, N. et al., "Analysis of Decision Feedback Detection for MIMO Rayleigh Fading Channels and Optimum Allocation of Trans-

(56) References Cited

OTHER PUBLICATIONS mitter Powers and QAM Constellations," pp. 1-10, 39th Annual Conference on Comm. Control and Comput., Monticello, IL Oct. 2001.
QFORGE Phase III Design Review, Apr. 2004.
Qualcomm Europe, Description and link simulations of MIMO schemes for OFDMA based E-UTRA downlink evaluation, 3GPP TSG-RAN WG1 #42 R1-050903, 3GPP, Sep. 2, 2005.
Qualcomm Europe: "Description and link simulations for OFDMA based E-UTRA uplink" 3GPP Draft; R1-051100, 3RD Generation Partnership Project (3GPP), Mobile Competence Centre; Sophia-Antipolis Cedex, France, vol. Ran WG1, no. San Diego, USA; Oct. 4, 2005, pp. 1-10, XP050100715.
S. Nishimura et al., "Downlink Nullforming by a Receiving Antenna Selection for a MIMO/SDMA Channel", Technical Search Report of Electric Information Communication Academic Conference, February 28, 2002, vol. 101, No. 683, pp. 17-22, RCS 2001-286.
Sandeep Chennakeshu et al., "A comparison of diversity schemes for a mixed-mode slow frequency-hopped cellular system," Global Telecommunications Conference, 1993, including a Communications Theory Mini-Conference. Technical Program Conference Record, IEEE in Houston. GLOBECOM '93., IEEE, Nov. 29, 1993, pp. 1749-1753, vol. 3.
Sari, et al., "Transmission Techniques for Digital Terrestrial TV Broadcasting," IEEE Communications Magazine, Feb. 1995, pp. 100-109.
Schnell, et al., "Application of IFDMA to Mobile Radio Transmission", IEEE 1998 International Conference on Universal Personal Communications, vol. 2, Oct. 5-9, 1998, pp. 1267-1272.
Schnell, M. et al., "A Promising New Wideband Multiple-Access Scheme for Future Mobile Communications Systems", European Transactions on Telecommunications, Jul. 1, 1999, vol. 10, No. 4, pp. 417-427, Wiley & Sons, Chichester, GB, XP009069928, ISSN: 1 124-31 8X.
Shattil et al., "Array Control Systems for Multicarrier Protocols Using a Frequency-Shifted Feedback Cavity", Radio and Wireless Conference EEE, Aug 1-4, 1999, pp. 215- 218.
Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 54,104-106.
Sorger U., et al., "Interleaved FDMA—A New Spread-Spectrum Multiple-Access Scheme, XP010284733," Communications, Conference Record, IEEE, Atlanta, GA, 1998, 1013-1017.
Sumii, Kenji, et al., "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
T. Kadous "SIC/H-ARQ in MIMO systems," Oct. 2003.
T. Suzuki , Rank prediction method in consideration of transmission diversity in a MIMO system, Technical study report of the Institute of Electronics, Information and Communication Engineers, Feb. 27, 2008, vol. 107, No. 518, pp. 281-286, RC52007-233 (Mar. 2008).
Taiwan Search Report—TW094123763—TIPO—Aug. 8, 2011.
Taiwan Search Report—TW095129021—TIPO—May 24, 2011.
Taiwan Search Report—TW095130842—TIPO—Jun. 18, 2011.
Taiwan Search Report—TW096146164—TIPO—Jun. 1, 2011.
Taiwanese Search report—095139878—TIPO—Nov. 8, 2010.
Taiwanese Search Report—095139893—TIPO—Dec. 30, 2010.
Taiwanese Search report—095139900—TIPO—Apr. 29, 2010.
Taiwanese Search report—095130842—TIPO—Jul. 30, 2010.
Taiwanese Search report—095142631—TIPO—Aug. 1, 2010.
Taiwanese Search report—096100636—TIPO—Aug. 4, 2010.
Telecommunications Industry Association, "Mobile Station-Base Station Compatibility Standard for Dual-Mode Wideband Spread Spectrum Cellular System," TIA/EIA-95, Jul. 1993.
Tellado, "Multicarrier Modulation with Low Par," Kluwer Academic, Dordrecht, NL, XP-002199500, 2000, pp. 6-11 and 55-60.
Tellambura, "Use of m-sequences for OFDM Peak-to-Average Power Ratio Reduction," Electronics Letters, vol. 33, No. 15, Jul. 17, 1997, pp. 1300-1301.
TIA-1121.001 "Physical Layer for Ultra Mobile Broadband (UMB) Air Interface Specification," 3GPP2 C.S0084-001-0, Version 2.0 (Aug. 2007).
TIA-1121.002 "Medium Access Control Layer for Ultra Mobile Broadband (UMB) Air Interface Specification," 3GPP2 C.S0084-002-0, Version 2.0 (Aug. 2007).
T.Kadous. "Implementation of Iterative Detection and Decoding in MIMO Systems," May 2003.
Tomcik J, "MBFDD and MBTDD Wideband Mode: Technology Overview", IEEE 802.20 Working Group Mobile Broadband Wireless Access, Jan. 6, 2006, 1-109.
Tomcik, Jim: "QFDD Technology Overview Presentation," IEEE 802.20 Working Group on Mobile Broadband Wireless Access, [Online] Nov. 15, 2005, pp. 1-73, XP002467626.
Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).
Toufik, I., et al., Channel allocation algorithms for multi-carrier systems, Vehicular Technology Conference 2004, VTC2004-Fall, 2004 IEEE 60th Los Angeles, CA, USA Sep. 26-29, 2004, Piscataway, NJ, USA IEEE, Sep. 26, 2004, pp. 1129-1133, XP010786798.
Translation of Office Action in Chinese Application 2006800295980 corresponding to U.S. Appl. No. 11/260,895, citing CN1346221 and CN1383631 dated Feb. 16, 2011.
Translation of Office Action in Japan application 2008-538193 corresponding to U.S. Appl. No. 11/261,065, citing JP11196109, JP10322304 and JP09008725 dated Mar. 8, 2011.
Translation of Office Action in Korean application 10-2007-7031029 corresponding to U.S. Appl. No. 11/260,931, citing US20030202491 and KR20040063057 dated Jan. 28, 2011.
Translation of Office Action in Canadian application 2625987 corresponding to U.S. Appl. No. 11/261,065, citing CA2557369 dated Apr. 12, 2011.
Translation of Office Action in Chinese application 200680040236.1 corresponding to U.S. Appl. No. 11/261,065, citing US20040048609 and CN1402916 dated Feb. 18, 2011.
Translation of Office Action in Chinese application 200680048265.2 corresponding to U.S. Appl. No. 11/260,931, citing US6904097, WO2004095851, CN1344451 dated Jan. 26, 2011.
Translation of Office Action in Chinese application 200680048832.4 corresponding to U.S. Appl. No. 11/261,158, citing CN1132474 dated Dec. 31, 2010.
Translation of Office Action in Japanese Application 2008-514880 corresponding to U.S. Appl. No. 11/445,377, citing JP2007519281 and JP2006505172 dated Nov. 9, 2010.
Translation of Office Action in Japanese application 2008-528103 corresponding to U.S. Appl. No. 11/260,924, citing JP2005502218, JP2004534456, J P2003348047, JP2003199173, JP2004529524, JP11508417, JP2001238269, JP2005130491 and JP2003500909 dated Feb. 8, 2011.
Translation of Office Action in Japanese Application 2008-529216 corresponding to U.S. Appl. No. 11/261,159, citing GB2348776 , WO2004098222, WO2005065062 and WO2004102815. Dated Oct. 1, 2011.
Translation of Office Action in Japanese application 2008-538181 corresponding to U.S. Appl. No. 11/511,735, citing W004064295, JP2002515203, JP8288927, JP7336323 and JP200157545 dated Jan. 25, 2011.
Viswanath p. et al: "Opportunistic beamforming using dumb antennas" IEEE Transactions on Information Theory IEEE Usa, vol. 48, No. 6, Jun. 2002, pp. 1277-1294, XP002314708 ISSN: 0018-9448 abstract right-hand column, paragraph 1.
Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).
Wang et al., "Improving performance of multi-user OFDM systems using bit-wise interleaver" Electronics Letters IEE Stevenage, GB, vol. 37. No. 19, Sep. 13, 2001, pp. 1173-1174 XP006017222.

(56) References Cited

OTHER PUBLICATIONS

Widdup, B. et al., "A highly-parallel VLSI architecture for a list sphere detector," IEEE International Conference, Paris, France, vol. 5, pp. 2720-2725 (2004).
Wiesel, A., et al., "Efficient implementation of sphere demodulation" Signal Processing Advances in Wireless Communications, 2003. SPAWC 200 3. 4th IEEE Workshop on Rome. Italy Jun. 15-18, 2003, Piscataway, NJ, USA, IEEE, US, Jun. 15, 2003, p. 36-40, XP010713463.
Written Opinion—PCT/US05/046742—International Search Authority, European Patent Office—Apr. 24, 2006.
Written Opinion—PCT/US06/021379—International Search Authority, European Patent Office—Oct. 16, 2006.
Written Opinion—PCT/US06/023095—International Search Authority, European Patent Office—Oct. 10, 2006.
Written Opinion—PCT/US06/032900, International Search Authority—European Patent Office, May 3, 2007.
Written Opinion—PCT/US06/060291, International Search Authority—European Patent Office, May 3, 2007.
Written Opinion—PCT/US06/060327—International Search Authority, European Patent Office, Mar. 1, 2007.
Written Opinion—PCT/US06/060333, International Search Authority—European Patent Office, Apr. 4, 2007.
Written Opinion, PCT/US05/024614, International Search Authority, European Patent Office—Oct. 20, 2005.
Written Opinion PCT/US06/014879 International Search Authority European Patent Office Oct. 19, 2007.
Written Opinion—PCT/US2006/010962, International Search Authority—European Patent Office—Aug. 4, 2006.
Written Opinion—PCT/US2006/060287, International Search Authority—European Patent Office—Apr. 4, 2008.
Xiaodong, et al., "M-Sequences for OFDM Peak-to-Average Power Ratio Reduction and Error Correction," Electronics Letters, vol. 33, Issue 7, Mar. 27, 1997, pp. 554-555.
Yee (US2005/0135498); Jun. 23,2005; Signal Decoding Methods and Apparatus.
Yun et al., "Performance of an LDPC-Coded Frequency-Hopping Qfdma System Based on Resource Allocation in the Uplink" Vehicular Technology—Conference 2004. VTO 2004—Spring, 2004 IEEE 59th Milan, Italy May 17-19, 2004, Piscataway, NJ, USA, vol. 4, 17—May 2004. pp. 1925-1928. XP010766497.
Zekri, et al., "DMT Signals with Low Peak-to-Average Power Ratio," Proceedings, IEEE International Symposium on Computers and Communications, 1999, Jul. 6-8, 1999, pp. 362-368.
Alcatel-Lucent, et al., "Dedicated Reference Signals for Precoding in E-UTRA Downlink" 3GPP Draft; R1-071718, 3rd Generation Partnership Project (3GPP), Mobile Competence Centre ; 650, Route Des Lucioles ; F-06921 Sophia-Antipolis Cedex ; France, vol. Ran WG1, No. St. Julian; 20070403, Apr. 3, 2007, XP050105640.
Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nfo/36211.htm> [retrieved on Sep. 27, 2007] Section 5.
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Bhushan N., "UHDR Overview", C30-20060522-037, Denver, CO, May 22, 2006, pp. 1-115.
European Search Report—EP10184156—Search Authority—Munich—Jun. 14, 2012.
Jim Tomcik, QFDd and QTDD: Technology Overview, IEEE 802.20 Working Group on Mobile Broadband Wireless Access, Oct. 28, 2005, pp. 48-50, URL, HTTP://WWW.IEEE802.ORG/20/CONTRIBS/C802.20-05-68.ZIP.
Ken Murakami et al., "Status Toward Standardization at IEEE 802.3ah and items on the construction of GE-PON system ," Technical Report of the Institute of Electronics, Information and Communication Engineers, Jun. 13, 2003, vol. 103, No. 124, pp. 1-6, IN2003-24.
Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
NOKIA: "Compact signalling of multi-code allocation for HSDPA", version 2,3GPP R1-02-0018, Jan. 11, 2002.
Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.
Samsung: "Uplink Transmission and Multiplexing for EUTRA", 3GPP Draft; R1-050605 UL Multiplexing, Jun. 16, 2005, XP050111420.
Sethi M, et al., "Code Reuse DS-CDMA—A Space Time Approach", Proceedings of the 2002 IEEE International Conference on Acoustics, Speech, and Signal Processing (ICASSP), pp. 2297-2300, May 13-17, 2002.
Siemens, "Evolved UTRA uplink scheduling and frequency reuse" [online], 3GPP TSG-RAN WG1 # 41 R1-050476, Internet <URL:http://www.3gpp.org/ftp/tsg_ran/WG1_RL1/TSGR1_41/Docs/R1-050476.zip>, May 9, 2005.
Tachikawa (Editor); "W-CDMA Mobile Communication Systems," John Wiley & Sons Ltd., Japan, Maruzen: pp. 82-213, Jun. 25, 2001.
Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.
LG Electronics: "PAPR comparison of uplink MA schemes", 3GPP TSG RAN WG1 Meeting #41, R1-050475, May 9-13, 2005, pp. 6.
Motorola,"Uplink Numerology and Frame Structure", 3GPP TAG RAN1 #41 Meeting R1-050397, May 13, 2005.
Samsung Electonics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg_ran/WG1_R1/TSGR1/ DOCS / [retrieved on Feb. 7, 2012].
Tomcik J., "QFDD and QTDD: Proposed Draft Air Interface Specification," IEEE C802.20-05/69, IEEE 802.20 Working Group on Mobile Broadband Wireless Access, Oct. 28, 2005, p. 1-6,1-7,1-16,6-65,7-11,7-33,7-37-7-55,9-21,9-22,9-24-9-32.
Digital cellular telecommunications system (Phase 2+); General Packet Radio Service (GPRS); Mobile Station (MS)-Base Station System (BSS)interface; Radio Link Control/Medium Access Control (RLC/MAC) protocol (GSM 04.60 version 8.4.1 Release 1999), 3GPP Standard; ETSI EN 301 349, 3rd Generation Partnership Project (3GPP), Mobile Competence Centre ; 650, Route Des Lucioles ; F-06921 Sophia-Antipolis Cedex ; France, No. V8.4.1, Oct. 1, 2000, pp. 1-243, XP050358534.

* cited by examiner

FREQUENCY HOPPING DESIGN FOR SINGLE CARRIER FDMA SYSTEMS

CROSS-REFERENCE TO RELATED APPLICATIONS

This present Application for Patent is a divisional of U.S. patent application Ser. No. 11/209,246, entitled "FREQUENCY HOPPING DESIGN FOR SINGLE CARRIER FDMA SYSTEMS", filed Aug. 22, 2005, pending, which is assigned to the assignee of the present application and claims benefit under 35 U.S.C. §119(e) from U.S. Provisional Patent Application Ser. No. 60/672,575, entitled "FREQUENCY HOPPING IN INTERLEAVED FREQUENCY DIVISION MULTIPLE ACCESS COMMUNICATION SYSTEMS," filed Apr. 19, 2005, and U.S. Provisional Patent Application Ser. No. 60/691,755, entitled "FREQUENCY HOPPING DESIGN FOR SINGLE CARRIER FDMA SYSTEMS", filed Jun. 16, 2005, all of which are incorporated by reference herein in their entirety.

REFERENCE TO CO-PENDING APPLICATIONS FOR PATENT

The present Application for Patent is related to the following co-pending U.S. patent application Ser. No. 11/173,873, filed Jun. 30, 2005 assigned to the assignee hereof, and expressly incorporated by reference herein.

BACKGROUND

I. Field

The following description relates generally to wireless communications, and more particularly to mitigating interference between user devices in nearby communication sectors by employing frequency hopping in a single carrier FDMA network environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless communication can be split into 30 channels, each of which can carry a voice conversation or, with digital service, carry digital data. Each channel can be assigned to only one user at a time. One known variant is an orthogonal frequency division technique that effectively partitions the overall system bandwidth into multiple orthogonal subbands. These subbands are also referred to as tones, carriers, subcarriers, bins, and frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control and/or rate prediction for one or more mobile terminals.

In the case of OFDMA-based systems, the particular waveforms and power required to transmit communication signals thereon typically exhibit an undesirably high peak-to-average ratio (PAR), which limits the coverage of OFDMA systems due to the inefficiencies of non-linear power amplifiers. Single carrier FDMA systems can mitigate problems associated with an undesirably high PAR, but are still subject to a variety of limitations that create a need in the art for a system and/or methodology of mitigating interference between mobile devices and/or sectors in such wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method of generating transmission symbols can comprise generating at least one single-carrier FDMA symbol, assigning a set of subcarriers to transmit the at least one symbol, generating at least one other single carrier FDMA symbol, and varying subcarrier set assignments according to a predetermined pattern for transmission of the at least one other single-carrier FDMA symbol. Varying the subcarrier set assignments can comprise changing an assignment of at least one offset in a predetermined set of offsets. The predetermined pattern can be delineated by transmission of a number of frames, expiration of a time period, etc., and subcarrier set assignments can be varied at fixed intervals delineated by the transmission of a predetermined number of single-carrier FDMA symbols. Additionally, assigning subcarriers to a user device can comprise generating a channel tree including a plurality of nodes, assigning each child node a node value that represents a non-negative integer, and assigning a user device to a node in the channel tree to define the subcarrier set assigned to the user device.

According to another aspect, an apparatus that facilitates frequency hopping for single carrier FDMA communication can comprise a memory and a processor coupled with the memory, the processor configured to assign an offset to a user device and to vary the offset for the user device according to a predetermined pattern. Nodes in the channel tree can be assigned values, and the processor can read the channel tree along a path from the node assigned to the user device to the first child node of a root node in the channel tree and evaluate a value for the path. Additionally, the processor can be further configured to perform a table lookup to identify an offset corresponding to the value of the path from the node assigned to the user device to the root node and assigns to at least one of the user devices the identified offset. The user device can thus be assigned an offset corresponding to the value of the path to the node assigned to the user device from the root node. The processor can periodically permute node value assignments of one or more nodes in the channel tree to change the offset of the user device by changing the value of the path from the user-assigned node to the root node.

According to yet another aspect, an apparatus can comprise means for generating at least one single-carrier FDMA symbol, means for assigning a set of subcarriers to transmit the at least one symbol, means for generating at least one other single carrier FDMA symbol, and means for varying subcarrier set assignments, according to a predetermined pattern for transmission of the at least one other single-carrier FDMA symbol. The means for assigning can comprise means for allocating a node in a channel tree to the user device and means for assigning a value to each node in the channel tree and means for reading a path in the channel tree from an allocated user node to a root node to determine a value for nodes in the path that identifies the set of subcarriers to assign to the user device and a number of subcarriers to include in the set. The means for varying subcarrier set assignments can periodically alter values assigned to one or more nodes in the channel tree to vary the value of the path between the allocated user node and the root node. The means for assigning can assign a new set of subcarriers associated with the varied value of the path from the allocated user node to the root node upon variation by the means for varying subcarrier set assignments.

Yet another aspect relates to a computer-readable medium having stored thereon computer-executable instructions for assigning an offset-related entity to a user device and periodically varying the offset for the user device based at least in part on the assigned entity. The computer-readable medium can further comprise instructions for assigning a value to each node of a channel tree, allocating a node to at least one user device to assign a subcarrier set to the at least one user device, and permuting node values according to a pattern to change the subcarrier set assigned to the at least one user device.

Still another aspect relates to a wireless communication device that comprises a memory comprising information corresponding to a plurality of offset assignments for transmission of single-carrier FDMA symbols and a processor, coupled with the memory, the processor configured to vary the offset assignments according to a predetermined pattern based upon the information. The information can correspond to values for nodes of a channel tree, and the nodes can correspond to root nodes and child nodes. Additionally, the channel tree can be a non-binary channel tree wherein each node has one or more child nodes. Moreover, node values can correspond to values generated by reading the channel tree along a path from the node assigned to the user device to the first child node of a root node in the channel tree and evaluating a value for the path. Information related to node values, offsets, assignments, and the like can be stored in a look-up table in the wireless communication device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
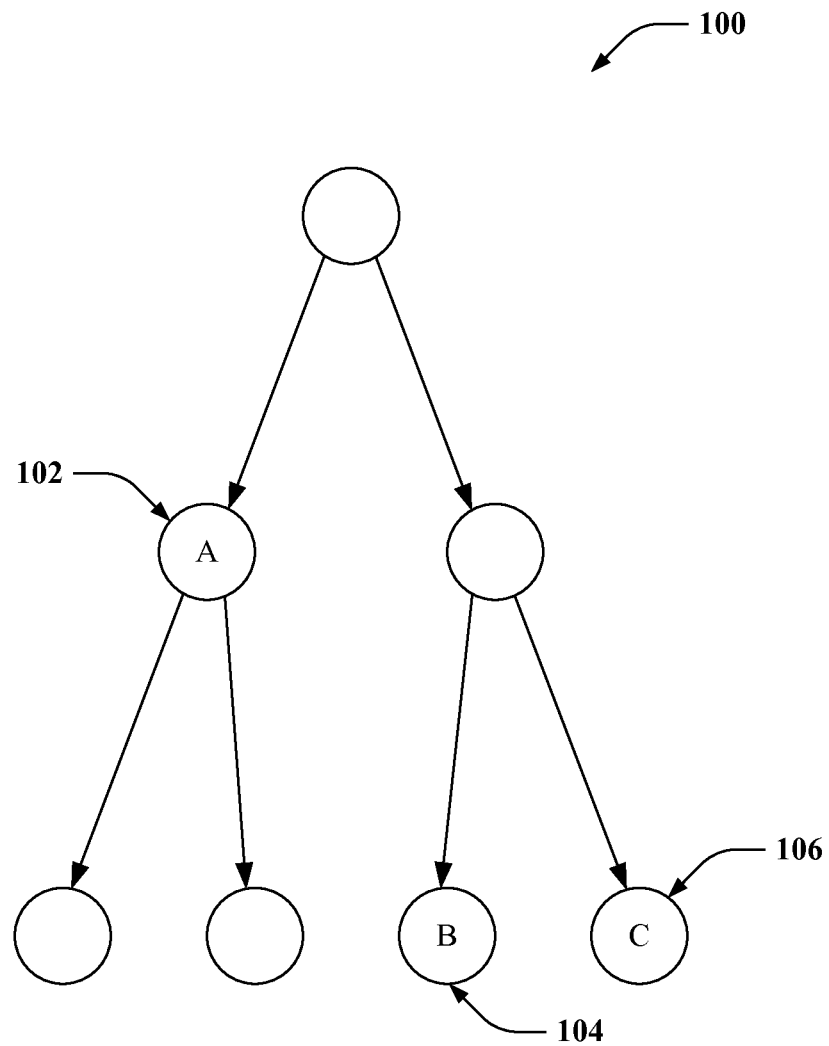
FIG. 1 illustrates a binary channel tree that can be employed in conjunction with a single carrier FDMA network to facilitate varying user device offsets in accordance with various aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, flash memory devices (e.g., card, stick, key drive . . . ), and integrated circuits such as read only memories, programmable read only memories, and electrically erasable programmable read only memories.

In order to facilitate frequency hopping, a single carrier FDMA modulation technique can be employed in a wireless network. For example, interleaved frequency division multiplexing (IFDM) can be employed to retain the benefits associated with orthogonal frequency division multiplexing (OFDM) protocols. In addition, in some cases, single carrier FDMA modulation techniques may have a lower peak-to-average (PAR) ratio problem compared with OFDM. Similarly, according to a related aspect, localized frequency division multiplexing (LFDM) can be employed, which can also exhibit a lower PAR while retaining other benefits associated with OFDM protocols. LFDMA is also known as "narrowband" FDMA, Classical FDMA, or just FDMA, and is a single carrier FDMA protocol.

OFDMA modulation symbols are in the frequency domain, and therefore the time domain signal obtained by performing a fast Fourier technique on the modulation symbol sequence can have an undesirably high PAR. By comparison, IFDMA modulation symbols are in the time domain, and therefore IFDMA modulation techniques do not exhibit the high PARs typically associated with OFDMA techniques. Thus, IFDMA (and similarly LFDMA) modulation protocols reduce undesirably high PAR and problems associated therewith.

In an IFDMA system, a total of $N_{FFT}$ subcarriers can be utilized, which are divided among a plurality of users. Each user can be allocated N carriers (where N can vary from user to user), as well as a user-specific subcarrier offset, U. Thus, a user with offset U occupies carriers $\{U, U+N_{FFT}/N, U+2N_{FFT}/N \ldots U+(N-1)N_{FFT}/N\}$. For example, in an IFDMA system a total of $N_{FFT}$ subcarriers can be divided among several users. Each user can be allocated N carriers (where N can vary from user device to user device), as well as a user device-specific subcarrier offset, U, where $0 \leq U < N_{FFT}/N$. When a user device transmits N modulation symbols $[d_0 \, d_1 \, d_2 \ldots d_{N-1}]$, the user device constructs an IFDMA symbol by performing the following acts:

(1) Repeating the N symbols to obtain a total of $N_{FFT}$ symbols
$[d_0 \, d_1 \, d_2 \ldots d_{N-1} \, d_0 \, d_1 \, d_2 \ldots d_{N-1} \, d_0 \, d_1 \, d_2 \ldots d_{N-1} \ldots d_0 \, d_1 \, d_2 \ldots d_{N-1}]$ (2) Multiplying the $k^{th}$ symbol in the sequence by $e^{-jk\Phi U}$ where $\Phi = 2\pi/N_{FFT}$
$[d_0 \, d_1 e^{-j\Phi U} \, d_2 e^{-2j\Phi U} \ldots d_{N-1} e^{-(N-1)j\Phi U} \ldots d_{N-2} e^{-(N_{FFT}-2)j\Phi U} d_{N-1} e^{-(N_{FFT}-1)j\Phi U}]$ (3) Optionally copying the last $N_{CP}$ symbols of the above symbol to the beginning (cyclic prefix)
$[\ldots \, d_{N-2} e^{-(N_{FFT}-2)j\Phi U} \, d_{N-1} e^{-(N_{FFT}-1)j\Phi U}]$
$[d_0 \, d_1 e^{-j\Phi U} \ldots d_{N-1} e^{-(N-1)j\Phi U} \ldots d_{N-1} e^{-(N_{FFT}-1)j\Phi U}]$ A resulting IFDMA symbol can then be converted to an analog symbol modulated using a carrier and transmitted in a manner similar to that in which an OFDMA symbol is transmitted. The foregoing is illustrative of IFDMA symbol generation on both a reverse link and a forward link. Additionally, since the IFDMA signal is periodic in the time domain (with the exception of the phase, $e^{-jk\Phi U}$), the signal can occupy a "comb" in frequency (e.g., only a set of N equally spaced subcarriers have a non-zero power, . . . ). More specifically, a user with offset U occupies the set of subcarriers $\{U, U+N_{FFT}/N, U+2N_{FFT}/N \ldots U+(N-1)N_{FFT}/N\}$, wherein the total set of subcarriers is indexed from 0 to $N_{FFT}-1$, such that user device orthogonality can be maintained because user devices with different offsets occupy different subcarrier sets.

Similarly, in an LFDMA system, a user can be allocated a number N of contiguous subcarriers (e.g., subcarriers that are consecutive in the frequency domain, . . . ). For example, a total of $N_{FFT}$ subcarriers can exist, which can be divided among several users. Each user can be allocated a user-specific subcarrier offset, U, such that a user with offset U occupies carriers $[U, U+1, \ldots, U+N-1]$. a user can be allocated a number N of contiguous subcarriers (e.g., subcarriers that are consecutive in the frequency domain, . . . ). Each user can be allocated N contiguous carriers (where N can vary from user device to user device), as well as a user-specific subcarrier offset, U, where $0 \leq U < N_{FFT}-N$, and where the total set of subcarriers is indexed from 0 to $N_{FFT}-1$. A user that transmits a set of N modulation symbols $[d_0 \, d_1 \, d_2 \ldots d_{N-1}]$ can generate a transmission signal by performing the following acts:

(1) Taking an N-point fast Fourier transform (FFT) of $[d_0 \, d_1 \, d_2 \ldots d_{N-1}]$ to obtain $[D_0 \, D_1 \, D_2 \ldots D_{N-1}]$ (2) Placing $[D_0 \, D_1 \, D_2 \ldots D_{N-1}]$ in the allocated sub-carriers $[U, U+1, \ldots, U+N-1]$.

(3) Taking an $N_{FFT}$-point inverse fast Fourier transform to obtain $N_{FFT}$ time domain samples.

(4) Optionally copying the last $N_{CP}$ time domain samples to the beginning of the symbol as a cyclic prefix to obtain the LFDMA time domain symbol.

Referring now to the drawings, FIG. 1 illustrates a binary channel tree 100 that can be employed in conjunction with a single carrier FDMA network to facilitate varying user device offsets in accordance with various aspects. The tree 100 comprises a plurality of nodes, each of which can be associated with a user device. For example, a first node 102 is associated with user A, and nodes 104 and 106 are assigned to users B and C, respectively. Various embodiments described herein facilitate changing user offsets, e.g. hopping sets of offset subcarriers. User offset variations can be performed using symbol rate hopping techniques (e.g., varied upon transmission of each symbol), block hopping techniques (e.g., varied upon transmission of a plurality of symbols), and the like. Additionally, a lookup table comprising information related to offsets, subcarrier sets, etc., can be employed to facilitate assigning and varying assignment of offsets to users. Offset assignment variation can be performed according to a predefined pattern, such as upon transmission of a single symbol, a predetermined number of symbols, a variable number of symbols, a fixed or variable time period, a fixed or variable number of frames, etc.

When employing an IFDMA protocol or an LFDMA protocol, in a system with $N_{FFT}=2^n$ assignable subcarriers, a particular user may be allotted $N=2^m$ subcarriers (where m is less than or equal to n). Additionally, different users can have different values of m. The binary tree 100 can facilitate assigning user offsets despite the variance of m between users. For instance, each user can be assigned a node in the tree 100 as described above. A tree-reading algorithm can be employed to compute an offset for a given user. Embodiments of such algorithms and approaches are discussed with regard to FIG. 2.

Additionally, in conjunction with various aspects set forth herein, offset assignment can be a function of a permutation protocol by which a predetermined set of offsets is permuted through nodes in a channel tree, and thus permuted through a set of user devices, allocated to nodes in the channel tree. For instance, nodes in channel tree 100 can be assigned a first set of offsets, and such offset assignments can be varied according to a predetermined pattern (e.g., every frame, every 2 frames, every symbol or group thereof, every one or more nanoseconds, etc.). Additionally, permutation protocols, predetermined offset sets, schedules, and the like can be unique to individual sectors and/or regions in a wireless network.

Figure 2:
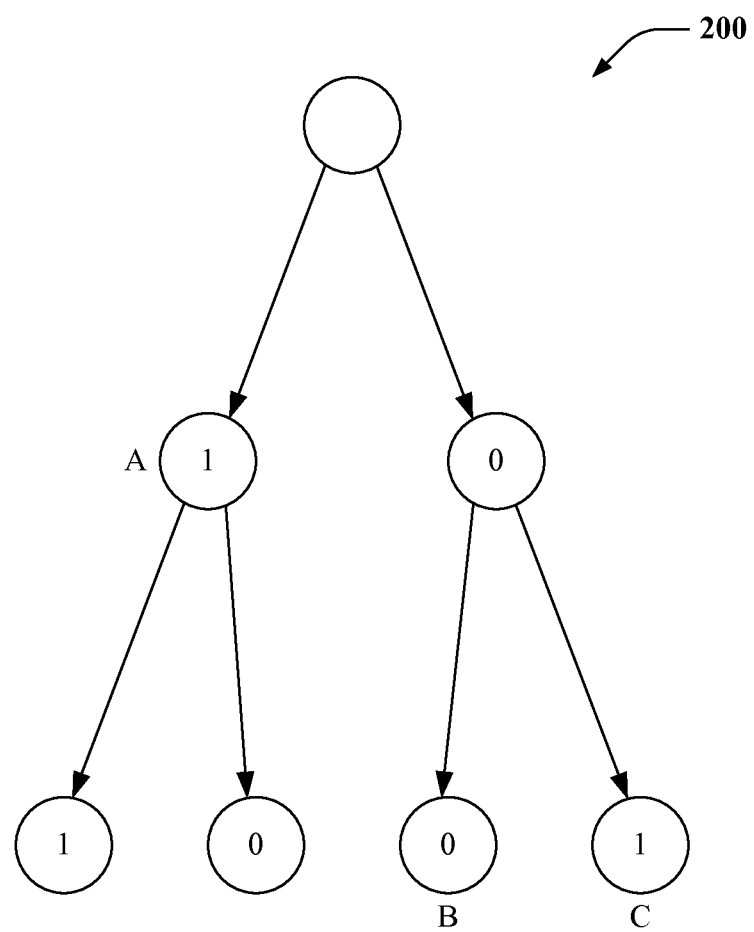
FIG. 2 is an illustration of a binary channel tree that facilitates determining an offset for a user in a single carrier FDMA wireless communication environment in accordance with various aspects.

FIG. 2 is an illustration of a binary channel tree 200 that facilitates determining an offset for a user in a single carrier FDMA wireless communication environment in accordance with various aspects. Tree 200 comprises a plurality of nodes, each of which has either a "0" value or "1" value. Nodes can be assigned to users of the wireless network, and offsets for each user can be evaluated by reading tree 200 in either an upward or downward direction.

For example, when employing an IFDMA protocol in conjunction with the wireless network, a "0" and a "1" are assigned to each child of a parent node. The assignment can vary from time to time and from sector to sector, in order to facilitate frequency hopping and interference diversity. The offset, U, of each user of the IFDMA-based network is the sequence read upward from the user-assigned node, wherein the user-assigned node represents the most significant bit in the offset U, and the root node's child node represents the least significant bit in the offset U. Thus, user A has offset 1, because it is assigned the first child node of the root node. User B has offset 0, as the most significant bit in user B's offset is a "0" and is read upward through the "0" child node of the root node, for an overall value of "00." User C has offset 2, as user C is assigned a "1" node that is read upward through the "0" child node of the root node for a total value of 10 binary, or 2 decimal. Information related to offsets associated with user-assigned nodes can be retrieved from a lookup table comprising such information upon assignment of a particular offset to a user.

Additionally, user device node allocation can be related to a number of subcarriers required by the particular user device. For instance, user A is allocated to a first child node in tree 200 such that there are two bits in user A's lineage (e.g., user A's allocated child node and the root node). In a scenario in which $N_{FFT}$ is 512 (e.g. a 9-bit-deep tree), user A can have a subcarrier requirement of at least $N_{FFT}/2$. Users B and C have a lineage three bits long, including the root node, and so are positioned on a third binary bit that represents a decimal value of 4. Thus, users B and C's offsets can comprise a number of subcarriers equal to $N_{FFT}/4$, and so on. It will be appreciated that the number of bits, nodes, users, total subcarriers, and the like described herein are illustrative in nature and should not be interpreted in a limiting sense and may also vary by the system design parameters. Rather, the various embodiments, aspects, systems, methods, techniques, etc., set forth herein can employ any suitable number of the above in order to achieve interference diversity and frequency hopping.

According to a related example, when employing an LFDMA protocol, the binary tree 200 can be read from top to bottom to determine a user's offset. Node assignments of "0" and "1" can vary with time and between sectors in a wireless network. Thus, an offset for a user is an n-bit quantity that can be padded with 0s for the least significant bits if necessary. When reading tree 200 in a downward direction, user A has offset 2 (e.g., 10 binary), user B has offset 0 (e.g., 00 binary), and user C has offset 1 (e.g., 01 binary). Information related to such offsets can be gleaned from a lookup table and can correspond to, in this example, $N_{FFT}/2$, 0, and $N_{FFT}/4$, respectively. Numbers of subcarriers associated with respective offsets can then be assigned to users.

It will be appreciated by one skilled in the art that although various embodiments described herein relate to IFDMA and LFDMA protocols, such embodiments can be employed in conjunction with any suitable OFDMA system. Additionally, the binary value assignments of some nodes and their ancestors can be performed on a sector-independent basis, such that a user allocated to such a node can retain the same offset regardless of which sector the user is in. In this manner, frequency reuse can be supported, for example when sectors do not use such nodes, while sectors that do employ such nodes can allocate weaker users thereto.

Figure 3:
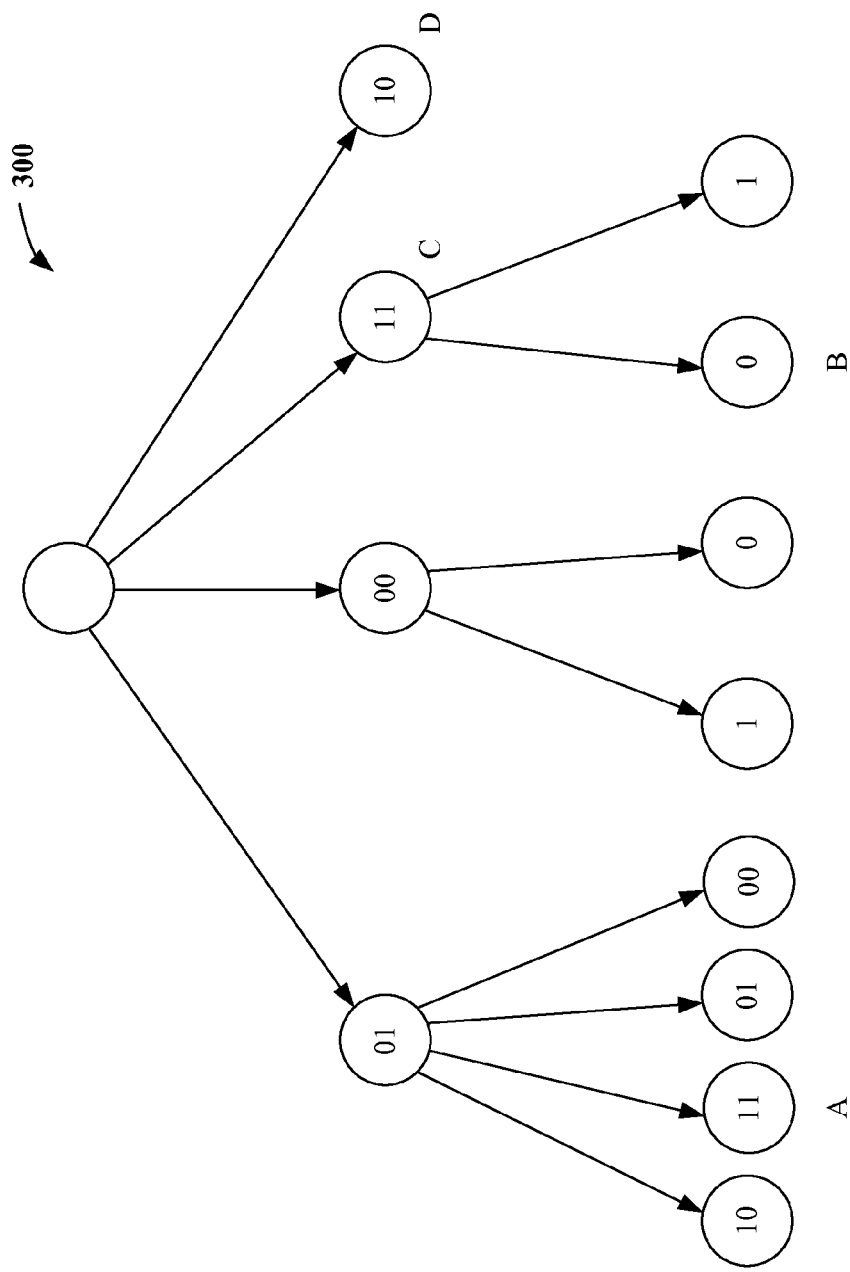
FIG. 3 is an illustration of a non-binary channel tree wherein user devices are allocated nodes in the tree and each node is assigned a value in accordance with various aspects.

FIG. 3 is an illustration of a non-binary channel tree 300 wherein user devices are allocated nodes in the tree and each node is assigned a value in accordance with various aspects. Non-binary channel tree 300 is similar to the binary assignment tree described with regard to FIG. 2. However, node assignments within channel tree 300 are not limited to binary values of 1 or 0, but rather can comprise any non-negative integer. For example, for a node having four children, the child nodes can be assigned values 0-3, (e.g., binary values 00, 01, 10, and 11, integer values of 0, 1, 2, and 3, etc.), while a parent node with only a pair of child nodes can have its children assigned values of 0 and 1, as set forth with regard to the binary channel tree of FIG. 2.

In non-binary channel tree 300, a number of subcarriers corresponding to a particular node can depend not only on the distance of the node to the root node, but also on the number of sibling nodes of each ancestor of the particular node. For instance, node A can have $N_{FFT}/16$ carriers because node A's parent is one of four siblings, and therefore receives $N_{FFT}/4$ subcarriers, which are then further divided into fourths among the four children of node A's parent (e.g., node A and its three siblings), which results in an assignment to node A of ¼ of $N_{FFT}/4$, or $N_{FFT}/16$ subcarriers. Node B can be assigned $N_{FFT}/8$ subcarriers because it has one sibling and its parent is one of four siblings. Thus, node B can be assigned ½ of its parent's $N_{FFT}/4$ subcarrier assignment, or $N_{FFT}/8$ subcarriers. Nodes C and D, being nodes in a set of four siblings directly pendant from the root node of non-binary channel tree 300, can each receive a subcarrier assignment equal to $N_{FFT}/4$. Information related to nodal relationships, offsets and/or subcarrier sets, and the like, can be stored in a lookup table that can be traversed in order to determine a user's assigned offset. It will be appreciated that the non-binary channel tree can be employed to facilitate assigning either or both of IFDMA and LFDMA subcarrier sets.

When performing offset computation in conjunction with an IFDMA communication environment, offsets can be computed by reading channel tree 300 from bottom to top. For instance, node A has an offset of 1101 when read through its parent toward the root node, and can be assigned offset 13 comprising $N_{FFT}/16$ subcarriers. Node D can receive offset 2 (e.g., 10 binary). It will be noted that nodes B and C are depicted as having offset values of 3 (e.g., 011, and 11, respectively). In such a scenario, both nodes can be assigned offset 3, and will not be assigned such offset simultaneously, but rather alternately in order to mitigate conflict.

In an LFDMA communication environment, offsets can be computed by reading the non-binary channel tree 300 from top to bottom (e.g., from a root node down through to a particular child node). A 0-padding technique can be employed to pad the offset values read from the root node to the child node based at least in part on a value of $N_{FFT}$. For example, if $N_{FFT}=512$, then a total of 9 bits are required to represent $N_{FFT}$ as a binary number. 0-padding can be employed to pad each offset read with zeros until the offset is a 9-bit value. For example, A has an offset of 0111 when read from the root node to node A, which can be padded with 5 zeros to make A's offset a 9-bit number, 0111-00000=224. Thus node A can be assigned offset 224, which, according to the example, will comprise 512/16, or 32, carriers. Similarly, node B has offset 011-000000=192, node C has offset 11-0000000=384, and node D has offset 10-0000000=256. Described more generally, node A has an offset equal to $9N_{FFT}/16$, node B is assigned offset to $3N_{FFT}/8$, node C is assigned offset to $3N_{FFT}/4$, and node D is assigned offset to $N_{FFT}/2$.

It will be appreciated that non-binary channel tree 300 can employ a set of predetermined offsets that can be permuted among user devices and/or nodes as described above with regard to FIG. 1. Additionally, changing the offsets can be performed according to a predetermined pattern, (e.g., every frame, every symbol, upon expiration of a time period, etc.) and such schedules can be sector-specific.

With respect to FIGS. 1-3, the assignments and hopping sequences of the nodes may be transmitted from a base station to a user device in initialization over time. This may be updated as appropriate. For example, assignments can be determined by reading the look-up tables at the user device for transmission to the base station, uplink, and for reception at the user device, downlink, based upon instructions transmitted from the base station. The instructions may, according to an aspect, comprise an identifier of a sequence, which may be repeated depending on the length of sequence that is stored at the user device. In other aspects, the node values may be updated regularly, based upon control channel messages from the base station.

In some embodiments, the channel assignments and single carrier transmissions may only apply to the uplink while the downlink transmissions use one or more OFDM schemes. In these cases, one or more OFDM type access schemes may be utilized on the downlink that are independent from the schemes utilized on the uplink.

Figure 4:
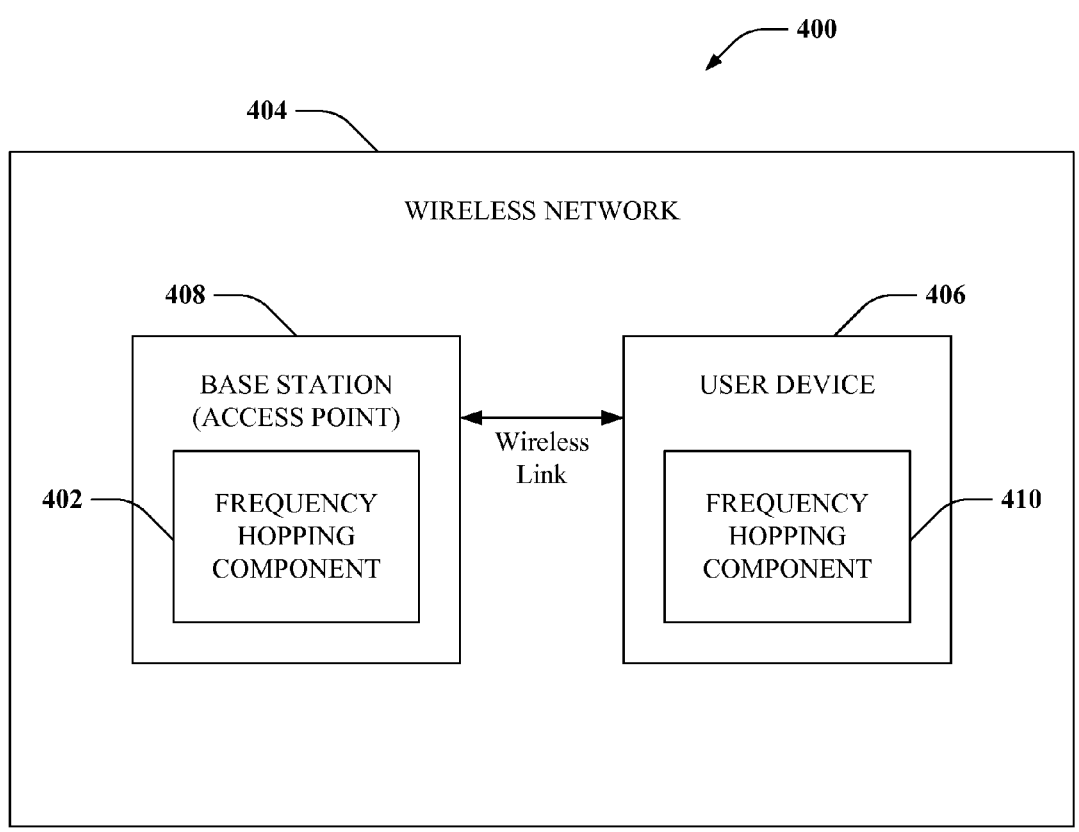
FIG. 4 illustrates a system that facilitates frequency hopping in a single carrier FDMA wireless communication environment in accordance with one or more aspects.

FIG. 4 illustrates a system 400 that facilitates frequency hopping in a single carrier FDMA wireless communication environment in accordance with one or more aspects. A frequency hopping component 402 is operatively associated with a base station 408 (e.g., an access point). Wireless network 404 can comprise one or more base stations 408 in one or more sectors and/or regions comprising a plurality of sectors, etc., as will be appreciated by one skilled in the art. User devices 406 can comprise, without being limited to, cellular phones, smartphones, PDAs, laptop computers, personal computers, and/or any other suitable device with which a user can communicate over wireless network 404. A separate frequency hopping component 410 resides at the user device 406 and can vary the offsets according to instructions from frequency hopping component 402.

Frequency hopping component 402 can vary node value assignments for one or more user devices 406 allocated to nodes in a channel tree, such as the trees described with regard to FIGS. 1, 2, and 3. Node values (e.g., non-binary, binary, etc.) can be assigned to nodes in the channel tree and the tree can be traversed to determine an overall offset assignment. In the case of a binary channel tree, child nodes of each parent node in the channel tree can be assigned a 1 and a 0, such that each parent node has a 1-child and a 0-child. User devices 406 can be allocated to such nodes, and, depending on the particular single carrier FDMA protocol employed, frequency hopping component 402 can read the binary tree to evaluate user offset assignments and can evaluate a lookup table comprising information related to respective offsets (e.g., offset identity, subcarrier number, . . . ). Additionally, frequency hopping component 402 can change node value assignments (e.g., 1s and 0s and/or other binary node values, non-binary node values, etc.) for different sectors and at different times in order to facilitate frequency hopping and alteration of user offset assignments. It is to be appreciated that frequency hopping component 402 can be integral to one or more base stations 408 in wireless network 404 and/or to user device(s) 406.

While FIG. 4, depicts the frequency hopping component 402 as residing in the base station, it should be noted that frequency hopping component 402 may be implemented as a combination of functionality in both base station 408, a base station controller (not shown), or the like of wireless network 404, and in user device 406 (e.g., frequency hopping component 410). In such aspects, it may be possible to contain separate look-up tables in user device 406 and base station 408 which each correspond to offsets, which are known to both devices, e.g. by instructions from base station 408 that corresponds to user device 406, or some other means.

In various embodiments, where the frequency hopping component 402 resides in the base station 408, the user device 406 may have a look-up table that corresponds to a sequence for varying the offset U based upon instructions, commands, or the like transmitted from the base station 408 and generated by frequency hopping component 402.

Figure 5:
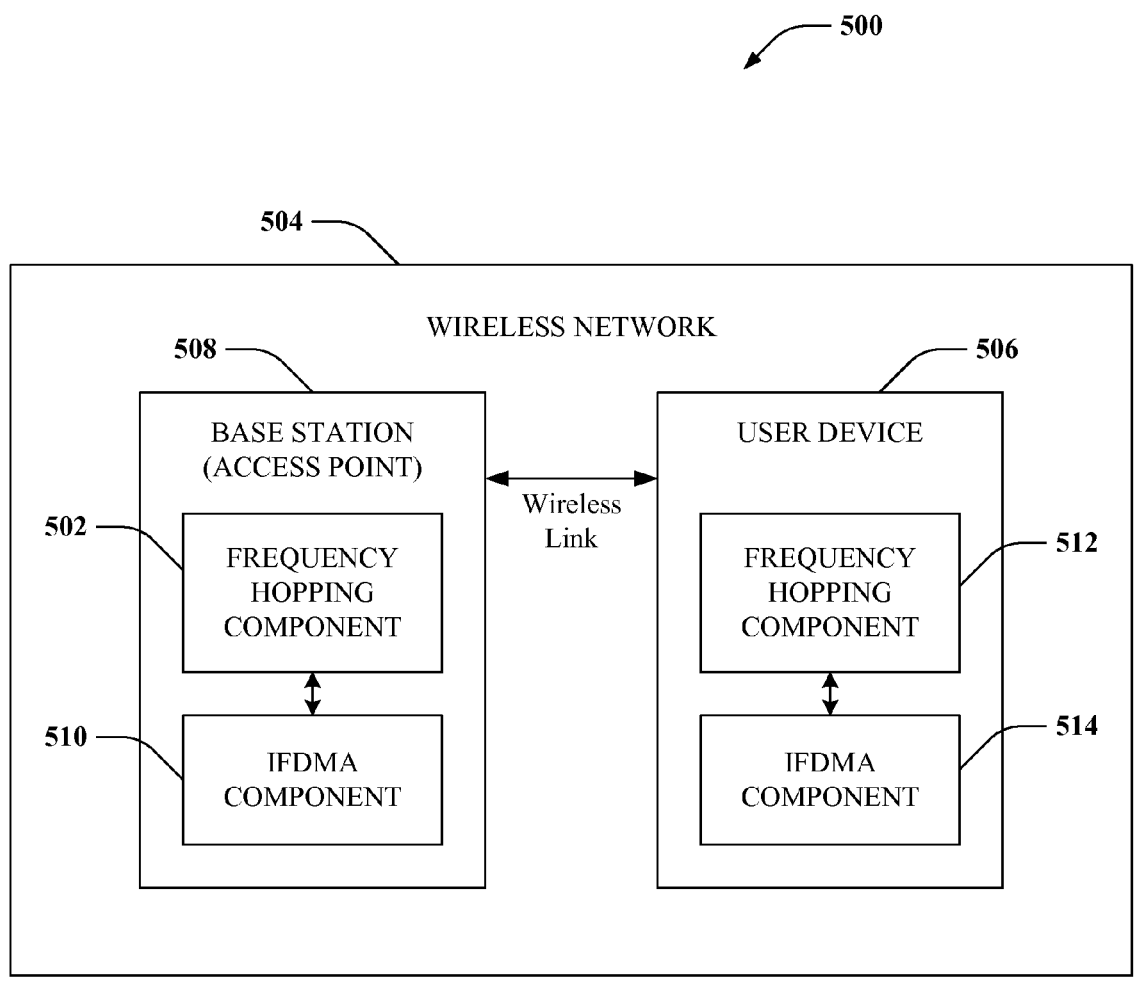
FIG. 5 is an illustration of a system that facilitates employing a frequency hopping technique in a single carrier FDMA environment, such as an IFDMA wireless communication environment in accordance with various aspects.

FIG. 5 is an illustration of a system 500 that facilitates employing a frequency hopping technique in a single carrier FDMA environment, such as an IFDMA wireless communication environment in accordance with one or more aspects. A frequency hopping component 502 is operatively associated with and integral to a base station 508. A separate frequency hopping component 512 resides at the user device 506 and will vary the offsets according to instructions from frequency hopping component 502.

Additionally, frequency hopping components 502 and 512 are respectively associated with an IFDMA components 510 and 514, which facilitates wireless communication using an IFDMA protocol. For example, in an IFDMA system a total of $N_{FFT}$ subcarriers can be divided among several user devices 506. Each user device 506 can be allocated N carriers (where N can vary from user device to user device), as well as a user device-specific subcarrier offset, U, where $0 \leq U < N_{FFT}/N$. When a user device 506 transmits N modulation symbols $[d_0\ d_1\ d_2\ \ldots\ d_{N-1}]$, user device 506 constructs an IFDMA symbol by performing the following acts:

(1) Repeating the N symbols to obtain a total of $N_{FFT}$ symbols
$[d_0\ d_1\ d_2\ \ldots\ d_{N-1}\ d_0\ d_1\ d_2\ \ldots\ d_{N-1}\ d_0\ d_1\ d_2\ \ldots\ d_{N-1}\ \ldots\ d_0\ d_1\ d_2\ \ldots\ d_{N-1}]$ (2) Multiplying the $k^{th}$ symbol in the sequence by $e^{-jk\Phi U}$ where $\Phi = 2\pi/N_{FFT}$
$[d_0\ d_1 e^{-j\Phi U} d_2 e^{-2j\Phi U} \ldots d_{N-1} e^{-(N-1)j\Phi U} \ldots d_{N-2} e^{-(N_{FFT}-2)j\Phi U} d_{N-1} e^{-(N_{FFT}-1)j\Phi U}]$ (3) Optionally copying the last $N_{CP}$ symbols of the above symbol to the beginning (cyclic prefix)
$[\ .\ .\ .\ d_{N-2} e^{-(N_{FFT}-2)j\Phi U}\ d_{N-1} e^{-(N_{FFT}-1)j\Phi U}]$
$[d_0\ d_1 e^{-j\Phi U} \ldots d_{N-1} e^{-(N-1)j\Phi U} \ldots d_{N-1} e^{-(N_{FFT}-1)j\Phi U}]$ A resulting IFDMA symbol can then be converted to an analog symbol modulated using a carrier and transmitted. The foregoing is illustrative of IFDMA symbol generation on both a reverse link and a forward link. Additionally, since the IFDMA signal is periodic in the time domain (with the exception of the phase, $e^{-jk\Phi U}$), the signal can occupy a "comb" in frequency (e.g., only a set of N equally spaced subcarriers have a non-zero power, . . . ). More specifically, a user device 506 with offset U occupies the set of subcarriers $\{U, U+N_{FFT}/N, U+2N_{FFT}/N \ldots U+(N-1)N_{FFT}/N\}$, wherein the total set of subcarriers is indexed from 0 to $N_{FFT}-1$, such that user device orthogonality can be maintained because user devices with different offsets occupy different subcarrier sets. Frequency hopping component 502 can generate, or store look-up tables that correspond to, offsets, node value assignments, etc., and can assign user devices 506 to nodes as described with regard to FIGS. 1-3. Additionally, where an IFDMA protocol is utilized, frequency hopping component 502 can read the tree from the root node downward to identify a particular user device's offset U. It is to be appreciated that the manner of assigning user devices to particular nodes can encompass arbitrary assignments, node assignments in a channel tree using non-binary node values, binary node values, or any other suitable manner of associating offsets with nodes and/or user devices 506. Moreover, it will be understood that node value assignments can be varied arbitrarily, randomly, according to a predetermined pattern and/or upon an occurrence of an event (e.g. transmission of one or more symbols, one or more frames, expiration of a time period, . . . ) etc.

While FIG. 5 depicts the frequency hopping component 502 as residing in the base station, it should be noted that frequency hopping component 502 may be implemented as a combination of functionality in both base station 508, base station controller (not shown) and in user device 506 (e.g., frequency hopping component 512). In such aspects, it may be possible to contain separate look-up tables in user device 506 and base station 508 which each correspond to sequences for offset U for the user device, which are known to both devices, e.g. by instructions from base station 508 that corresponds to user device 506, or some other means.

In the embodiments, where the frequency hopping component 502 resides in the base station 508, the user device 506 may have a look-up table that corresponds to a sequence for varying the offset U based upon instructions, commands, or the like transmitted from the base station 508 and generated by frequency hopping component 502.

Figure 6:
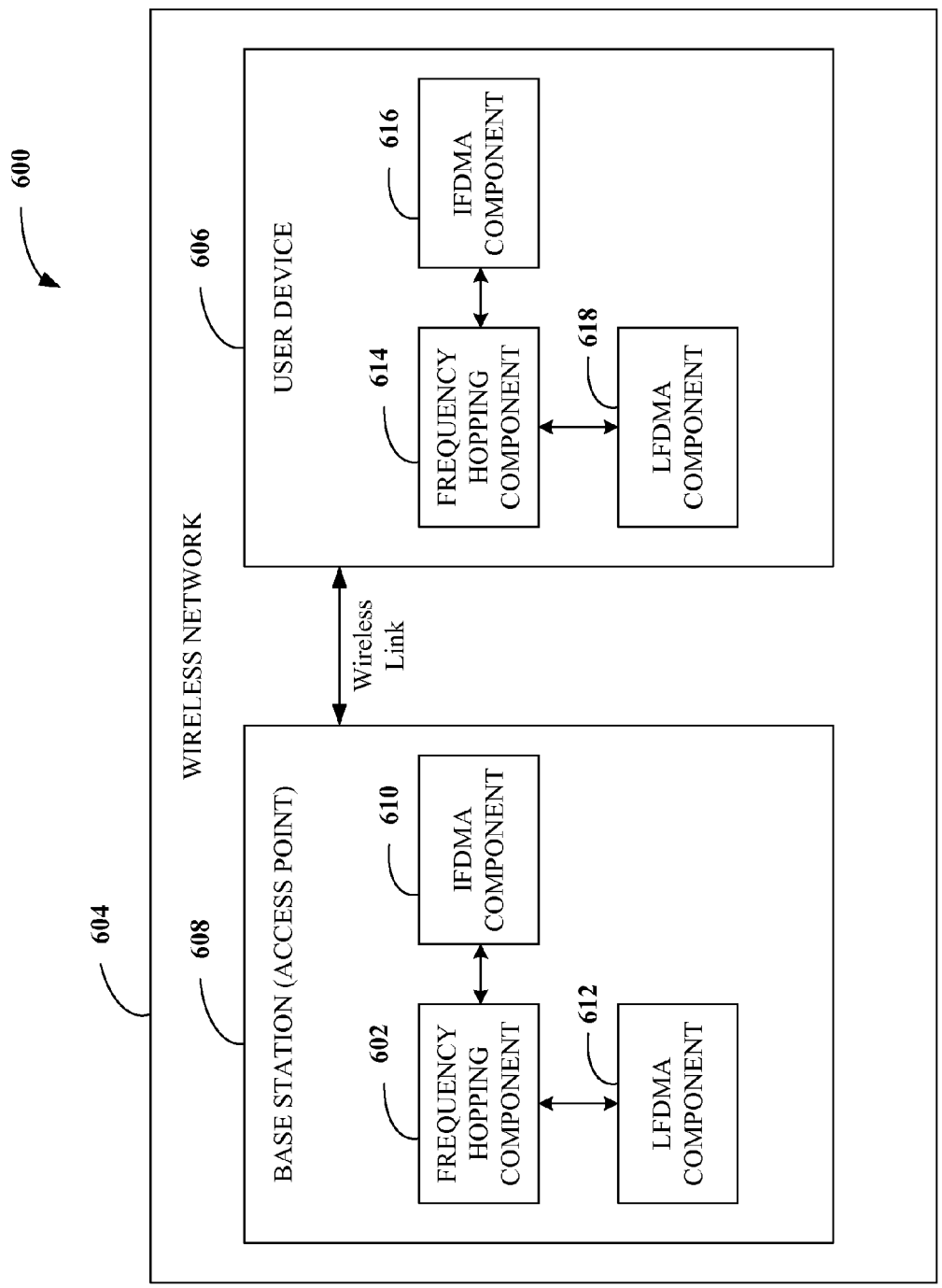
FIG. 6 is an illustration of a system that facilitates employing a frequency hopping technique in a single carrier FDMA environment, such as an LFDMA wireless communication environment in accordance with various aspects.

FIG. 6 is an illustration of a system 600 that facilitates employing a frequency hopping technique in a single carrier FDMA environment, such as an LFDMA wireless communication environment in accordance with one or more aspects. System 600 comprises a frequency hopping component 602 that is operatively associated with an access point 608. A separate frequency hopping component 614 resides at the user device 606 and will vary the offsets according to instructions from frequency hopping component 602.

Frequency hopping component 602 can be further operatively associated with an IFDMA component 610 that facilitates communication over wireless network 604 as described above with regard to FIG. 5. Additionally and/or alternatively, frequency hopping component 602 can be further operatively coupled to an LFDMA component 612, which can facilitate LFDMA communication between base station 608 and user device 606. Similarly, frequency hopping component 614 can be operatively coupled to an IFDMA component 616 and an LFDMA component 618 in user device 606. Frequency hopping component 602 can generate a channel tree for offset assignment to user device 606, such that each of a plurality of user devices 606 can be allocated to a node in the offset tree. Each node in the tree can have a value, and such node values can be changed by frequency hopping component 602 from time to time and/or from sector to sector to provide interference diversity and frequency hopping functionality. Upon a determination of a value associated with a particular node, frequency hopping component 602 can perform a table lookup to evaluate an associated offset for assignment to a user device 606.

With regard to LFDMA components 612 and 618, a user device 606 can be allocated a number N of contiguous sub-carriers (e.g., subcarriers that are consecutive in the frequency domain, . . . ). For example, in an LFDMA system a total of $N_{FFT}$ subcarriers can be divided among several user devices 606. Each user device 606 can be allocated N contiguous carriers (where N can vary from user device to user device), as well as a user device-specific subcarrier offset, U, where $0 \leq U < N_{FFT} - N$, and where the total set of subcarriers is indexed from 0 to $N_{FFT}-1$. A user device that transmits a set of N modulation symbols $[d_0\ d_1\ d_2\ \ldots\ d_{N-1}]$ can generate a transmission signal by performing the following acts:

(1) Taking an N-point fast Fourier transform (FFT) of $[d_0\ d_1\ d_2\ \ldots\ d_{N-1}]$ to obtain $[D_0\ D_1\ D_2\ \ldots\ D_{N-1}]$
(2) Placing $[D_0\ D_1\ D_2\ \ldots\ D_{N-1}]$ in the allocated sub-carriers $[U, U+1, \ldots U+N-1]$.
(3) Taking an $N_{FFT}$-point inverse fast Fourier transform to obtain $N_{FFT}$ time domain samples.
(4) Optionally copying the last $N_{CP}$ time domain samples to the beginning of the symbol as a cyclic prefix to obtain the LFDMA time domain symbol.

In the above example of LFDMA signal generation, different user devices 606 can be allocated disjoint sets of subcarriers to ensure that user devices 606 are orthogonal to each other. Frequency hopping component 602 can then generate an assignment tree and evaluate assignments of user devices 606 to nodes therein as described with regard to FIGS. 1-3, and, where an LFDMA protocol is utilized, can read the tree from the root node downward to identify a particular user device's offset, U.

While FIG. 6 depicts frequency hopping component 602 as residing in the base station, it should be noted that frequency hopping component 602 may be implemented as a combination of functionality in both base station 608, base station controller (not shown), or the like of wireless network 604, and in user device 606 (e.g., frequency hopping component 614). In such aspects, it may be possible to contain separate look-up tables in user device 606 and base station 608, which each correspond to sequences for offset U for the user device 606, which are known to both devices, e.g. by instructions from base station 608 that corresponds to the user device 606, or some other means.

In the embodiments, where the frequency hopping component 602 resides in the base station 608, the user device 606 may have a look-up table that corresponds to a sequence for varying the offset U based upon instructions, commands, or the like transmitted from the base station 608 and generated by frequency hopping component 602.

Additionally, IFDMA components 610 and 616 and LFDMA components 612 and 618 can be employed in conjunction with one another to facilitate generation of subcarrier assignments that comprise equally spaced subcarriers that span less than the total available bandwidth, in accordance with various aspects set forth herein. Moreover, fast hopping techniques can be employed, potentially over a fraction of the available bandwidth when employing an IFDMA protocol. On a typical OFDMA uplink, a user device can be assigned a set of subcarriers, which is kept constant for a time to permit the user device to estimate the channel over that set of subcarriers. However, if the user device's assignment is large enough that the user device can estimate the channel over the entire bandwidth, then a symbol rate hopping protocol (e.g., varying a subcarrier set assignment for a user device upon transmission of each symbol) can be utilized because there is no detriment in hopping upon each symbol.

Figure 7:
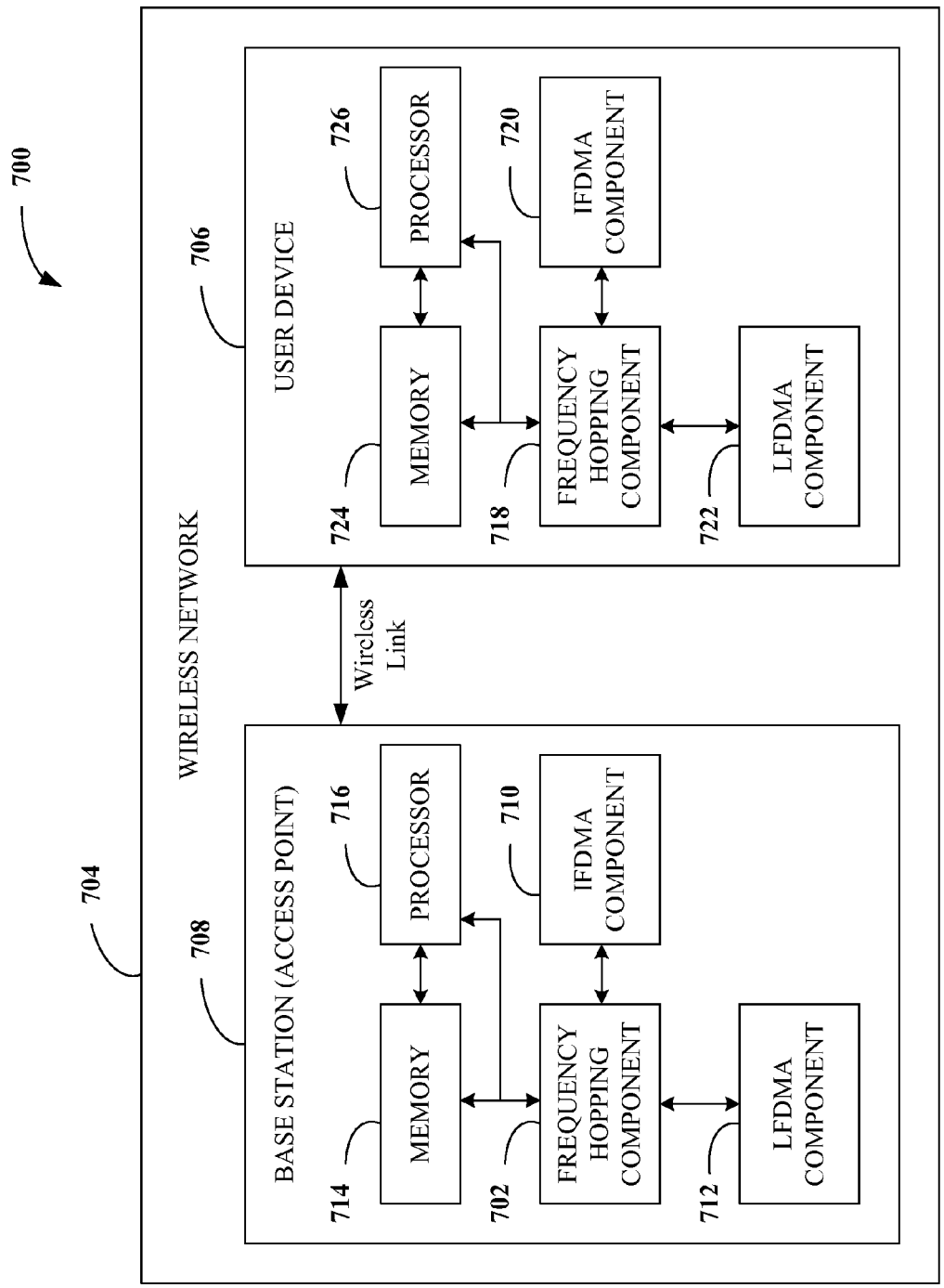
FIG. 7 is an illustration of a system that facilitates frequency hopping in a single carrier FDMA wireless communication environment in accordance with various aspects.

FIG. 7 is an illustration of a system 700 that facilitates frequency hopping in a single carrier FDMA wireless network environment. A frequency hopping component 702 may be operatively associated with a base station 708 in a wireless network 704. A separate frequency hopping component 718 resides at the user device 706 and can vary the offsets according to instructions from frequency hopping component 702.

Wireless network 704 can comprise one or more base stations 708 in one or more sectors and/or regions comprising a plurality of sectors, etc., as will be appreciated by one skilled in the art. User devices 706 can comprise, without being limited to, cellular phones, smartphones, PDAs, laptop computers, personal computers, and/or any other suitable device with which a user can communicate over wireless network 704. Frequency hopping component 702 in base station 708 can be associated with an IFDMA component 710 and/or an LFDMA component 712, or any other suitable single carrier FDMA system, to facilitate symbol generation as described above with regard to the preceding figures. Similarly, frequency hopping component 718 in user device 706 can be operatively coupled to each of an IFDMA component 720 and an LFDMA component 722.

Base station 708 and/or user device 706 can additionally and respectively comprise memories 714 and 724 that are operatively coupled to frequency hopping components 702 and 718, and that store information related to channel tree generation or pre-generated channel tree information that may be utilized, node value assignment (e.g., non-binary, binary, integer, etc.) of nodes in the channel tree, user device node allocation, tree-reading algorithms (e.g., top-down for LFDMA, bottom-up for IFDMA, . . . ), signal generation algorithms (e.g., for generating signals using IFDMA, LFDMA, single carrier FDMA, . . . ), time tables for node value assignment variation (e.g., frequency hopping, . . . ), lookup tables related to offset information and/or node value assignments, and any other suitable information related to providing interference diversity (e.g., frequency hopping) to mitigate interference of one or more user devices 706. Processors 716 and 726 can be operatively connected to frequency hopping components 702 and 718, respectively, and/or memories 714 and 724 to facilitate analysis of information related to frequency hopping, node assignment and/or allocation to one or more user devices 706, tree-reading algorithms, signal generation, and the like. It is to be appreciated that processor 716 can be a processor dedicated to analyzing and/or generating information received by frequency hopping component 702, a processor that controls one or more components of base station 708, and/or a processor that both analyzes and generates information received by frequency hopping component 702 and controls one or more components of base station 708. In a similar manner, processor 726 can be a processor dedicated to analyzing information received by frequency hopping component 718, a processor that controls one or more components of user device 706, and/or a processor that both analyzes information received by frequency hopping component 718 and controls one or more components user device 706.

Memories 714 and 724 can additionally store protocols associated with generating signals, symbols, channel trees, lookup tables, etc., such that user device 706 and/or base station 708 can employ stored protocols and/or algorithms to achieve interference diversity as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memories 714 and 724 of the subject systems and methods is intended to comprise, without being limited to, these and any other suitable types of memory.

While FIG. 7 depicts frequency hopping component 702 as residing in the base station 708, it should be noted that frequency hopping component 702 may be implemented as a combination of functionality in both base station 708, base station controller (not shown), or the like of wireless network 704, and in user device 706 (e.g., frequency hopping component 718). In such aspects, it may be possible to contain separate look-up tables in user device 706 and base station 708 which each correspond to sequences for offset U for the user device, which are known to both devices, e.g. by instructions from base station 708 that corresponds to the user device 706, or some other means.

In the embodiments, where the frequency hopping component 702 resides in the base station 708, the user device 706 may have a look-up table that corresponds to a sequence for varying the offset U based upon instructions, commands, or the like transmitted from the base station 708 and generated by frequency hopping component 702.

Figure 8:
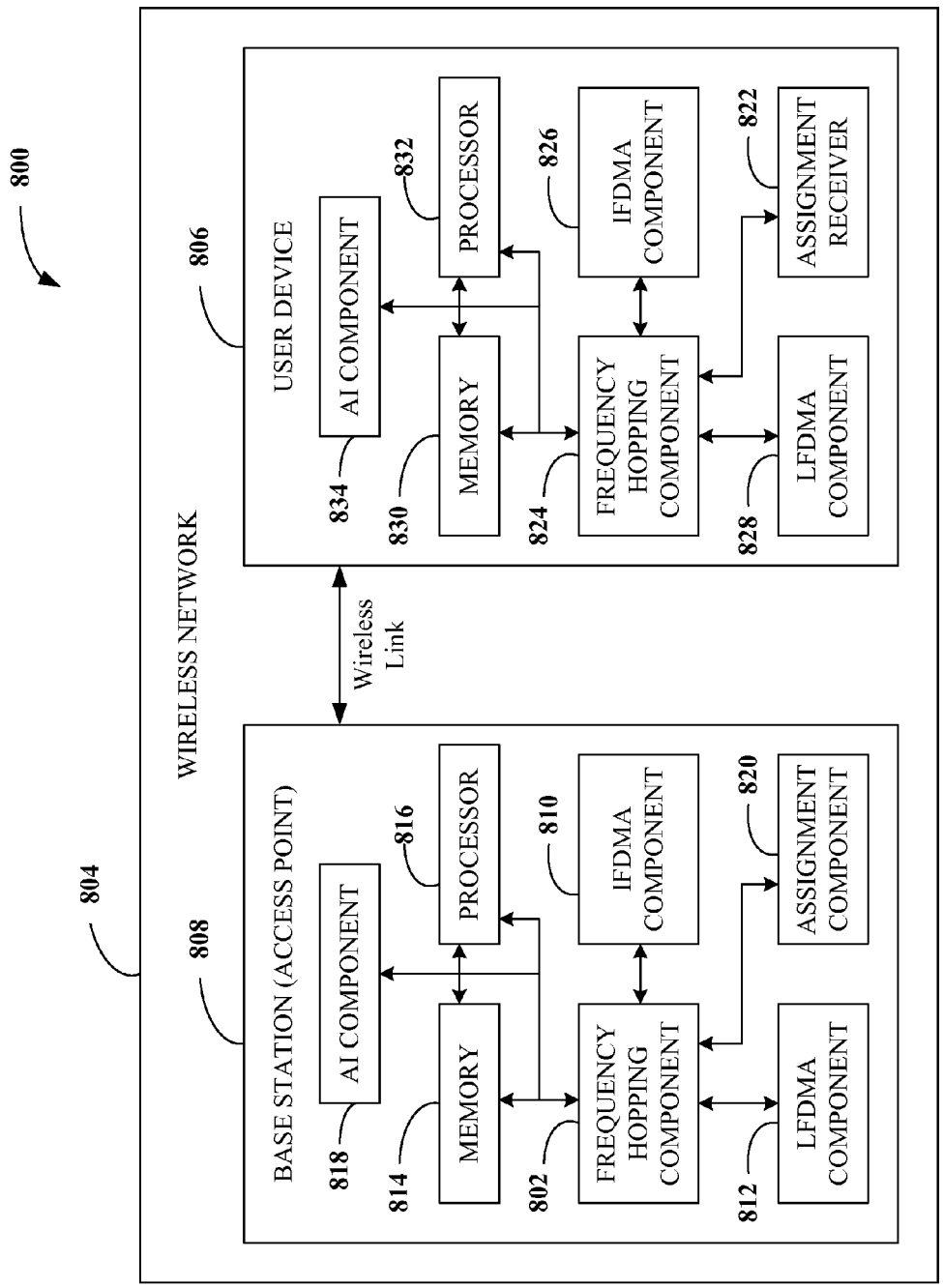
FIG. 8 is an illustration of a system that facilitates frequency hopping technique in an FDMA wireless communication environment in accordance with various aspects.

FIG. 8 is an illustration of a system 800 that facilitates frequency hopping technique in an FDMA wireless network environment in accordance with various aspects. A frequency hopping component 802 is operatively associated with a base station 808. A separate frequency hopping component 824 resides at the user device 806 and can vary the offsets according to instructions from frequency hopping component 802.

Wireless network 804 can comprise one or more base stations 808, repeaters, transceivers, etc. (not shown) in one or more sectors and/or regions comprising a plurality of sectors, etc., as will be appreciated by one skilled in the art. User devices 806 can comprise, without being limited to, cellular phones, smartphones, PDAs, laptop computers, personal computers, and/or any other suitable device with which a user can communicate over wireless network 804. Frequency hopping component 802 in base station 808 can be operatively associated with an IFDMA component 810 and/or an LFDMA component 812, or any other suitable single carrier FDMA system, to facilitate communication symbol generation as described above with regard to the preceding figures. Likewise, frequency hopping component 824 in user device 806 can be operatively associated with either or both of an IFDMA component 826 and an LFDMA component 828. Frequency hopping component 802 can be further associated with an assignment component 820 in base station 808 that assigns nodes to user devices 806, based at least in part on offset information stored in a lookup table, which can be retained in memory 814 and/or memory 830. Such assignments can be transmitted to an assignment receiver 822 in user device 806 and decoded by frequency hopping component 824 in user device 806. Assignment component 820 can assign nodes in the channel tree to user devices, and frequency hopping component 802 can vary offsets (e.g., by permuting/changing node value assignments) to maintain offset diversity and facilitate mitigating interference between user devices 806 and/or network sectors over which user devices 806 communicate. Additionally, frequency hopping component 802 can assign node values to nodes in a binary channel tree, such as described with regard to FIG. 2, and/or to nodes in a non-binary channel tree, such as described with regard to FIG. 3, in order to facilitate providing offsets to user devices 806. Moreover, frequency hopping component 802 can employ a non-binary channel tree in conjunction with the permutation protocol to optimize interference reduction.

Frequency hopping component 802 can assign subcarrier sets (e.g., offsets) to user devices 806 for transmission of one or more symbols during a communication event, as described above. For example, frequency hopping component 802 can generate and/or transmit an offset assignment at a first point in time, and such assignment can be varied (e.g., by changing node value assignments) according to a predetermined pattern (e.g., after transmission/receipt of each symbol, group of symbols, one or more frames, . . . ). To further this example, subcarrier set assignments to user devices 806 can be varied after a predetermined period, which can be delineated by transmission of a fixed number of symbols (e.g., IFDMA symbols, LFDMA symbols, or any other suitable single-carrier FDMA symbols).

Assignment receiver 822 in user device 806 receives a subcarrier set assignment (e.g., an offset assignment) to permit user device 806 to exert control over an assigned set of subcarriers for transmission of one or more symbols (e.g., IFDMA, LFDMA, . . . ) during a communication event. Assignment receiver 822 can receive and/or accept a node assignment and an offset for device 806 can be determined at a first point in time. A second offset can then be determined and/or computed upon alteration of node value assignments after a predetermined time period (e.g., after transmission/receipt of each symbol, group of symbols, . . . ). According to this example, offset assignments to user device 806 can be varied (e.g., by varying node values for nodes to which user devices are assigned, etc.) after a predetermined period that can be delineated by transmission of a number of symbols (e.g., IFDMA symbols, LFDMA symbols, or any other suitable single-carrier FDMA symbols). Furthermore, base station 808 can employ a memory 814, a processor 816, and an AI component 818 to facilitate assignment, assignment variation, acknowledgement, utilization, and the like in conjunction with the various frequency hopping protocols described herein. User device 806 can employ a memory 830, processor 832, and AI component 834 for like purposes.

AI components 818 and 834 can be respectively and operatively associated with frequency hopping components 802 and 824 in either or both of base station 808 and user device 806, and can make inferences regarding channel tree generation, node value assignments and alterations thereto, user device 806 node allocation, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, AI components 818 and/or 834 can infer an appropriate tree structure for representing user device offsets based at least in part on, for instance, channel quality, detected interference, number of available subcarriers, number of user devices 806 operating over wireless network 804, etc. According to this example, it can be determined that a particular sector or sectors in wireless network 804 are experiencing high transmission volume, and the like. AI component 818, in conjunction with processor 816 and/or memory 814, can determine that interference between user devices 806 and/or sectors is high. AI component 818 can infer that a frequency adjustment is appropriate to increase interference diversity and alleviate the interference problem, and can direct frequency hopping component 802 to alter child node value assignments in a channel tree, which will have the result of altering offset assignments to user devices 806 allocated to such altered child nodes. In such a case, AI component 818 can facilitate frequency hopping in the most cost-effective manner possible to mitigate inter-cell interference and improve interference diversity. It will be appreciated that the foregoing examples are illustrative in nature and are not intended to limit the scope of inferences that can be made by AI components 818 and 834 or the manner in which AI components 818 and 834 make such inferences.

While FIG. 8 depicts frequency hopping component 802 as residing in the base station 808, it should be noted that frequency hopping component 802 may be implemented as a combination of functionality in both base station 808, base station controller (not shown), or the like of wireless network 804, and in user device 806 (e.g., frequency hopping component 824). In such aspects, it may be possible to contain separate look-up tables in user device 806 and base station 808 which each correspond to sequences for offset U for the user device, which are known to both devices, e.g. by instructions from base station 808 that corresponds to the user device 806, or some other means.

In the embodiments, where the frequency hopping component 802 resides in the base station 808, the user device 806 may have a look-up table that corresponds to a sequence for varying the offset U based upon instructions, commands, or the like transmitted from the base station 808 and generated by frequency hopping component 802.

Figure 9:
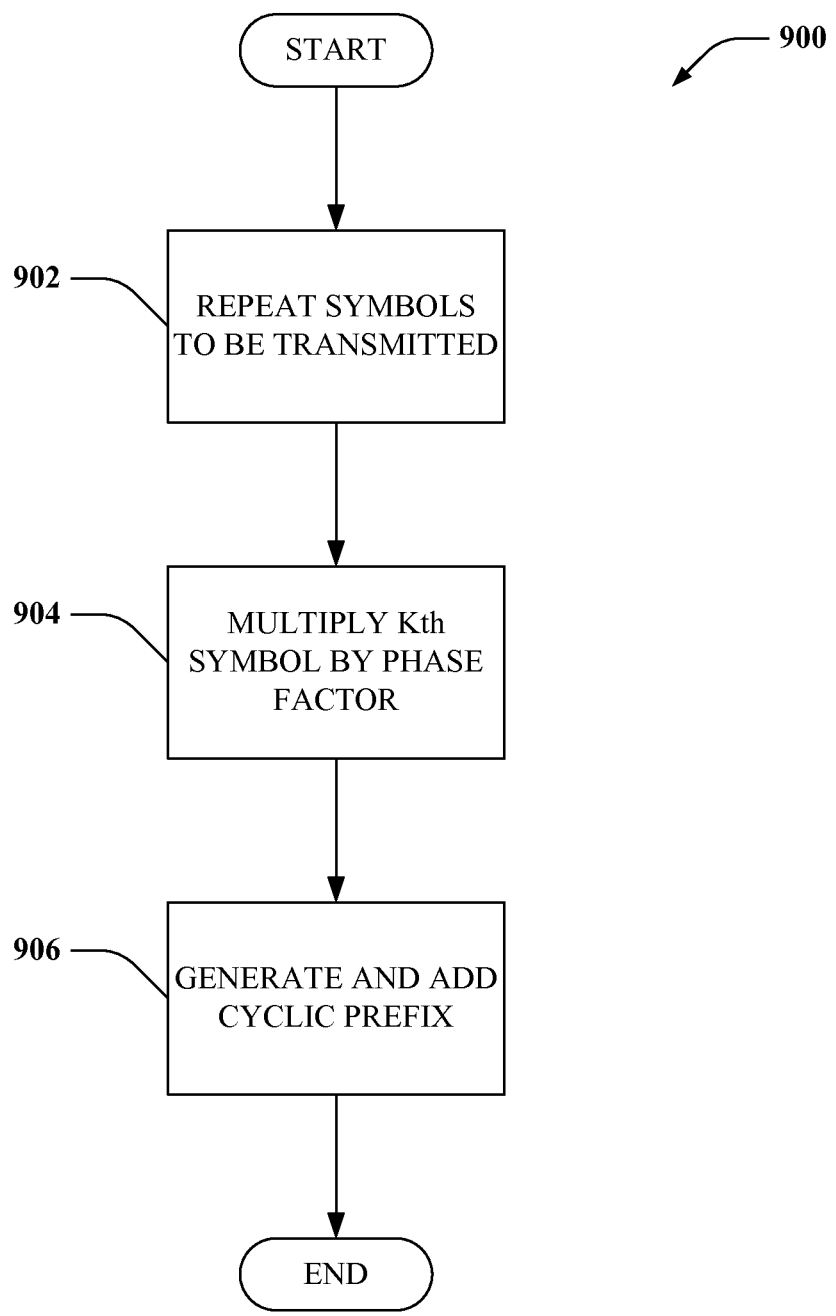
FIG. 9 is an illustration of a methodology for generating a signal using an IFDMA protocol, such as can be employed in conjunction with a frequency hopping protocol to improve interference diversity.

FIG. 9 is an illustration of a methodology 900 for generating a signal using an IFDMA protocol, such as can be employed in conjunction with a frequency hopping protocol to improve interference diversity. At 902, a user device can initiate generation of a signal comprising N modulation symbols, for example, $[d_0\ d_1\ d_2\ \ldots\ d_{N-1}]$, by repeating the N symbols to obtain a total of $N_{FFT}$ symbols such that:

$[d_0\ d_1\ d_2\ \ldots\ d_{N-1}\ d_0\ d_1\ d_2\ \ldots\ d_{N-1}\ d_0\ d_1\ d_2\ \ldots\ d_{N-1}\ \ldots\ d_0\ d_1\ d_2\ \ldots\ d_{N-1}]$ At 904, the user device can multiply the $k^{th}$ symbol in the sequence by $e^{-jk\Phi U}$, where $\Phi=2\pi/N_{FFT}$, such that:

$[d_0\ d_1 e^{-j\Phi U}\ d_2 e^{-2j\Phi U}\ \ldots\ d_{N-1}\ e^{-(N-1)j\Phi U}\ \ldots\ d_{N-2} e^{-(N_{FFT}-2)j\Phi U}\ d_{N-1} e^{-(N_{FFT}-1)j\Phi U}]$ At 906, cyclic prefix can optionally be added to the signal by copying the last $N_{CP}$ symbols of the signal generated at 904 to the beginning of the symbol expression, such that:

$[\ldots\ d_{N-2} e^{-(N_{FFT}-2)j\Phi U}\ d_{N-1} e^{-(N_{FFT}-1)j\Phi U}][d_0\ d_1 e^{-j\Phi U}\ \ldots\ d_{N-1}\ e^{-(N-1)j\Phi U}\ \ldots\ d_{N-1} e^{-(N_{FFT}-1)j\Phi U}]$ Method 900 can be employed in an IFDMA communication environment in conjunction with frequency hopping techniques set forth herein to mitigate interference between users and/or sectors in a wireless communication environment. It will be appreciated by one skilled in the art that although various methods and/or systems herein are described with regard to an IFDMA system, a suitable FDMA system arrangement having the described features and/or advantages of the IFDMA system can be employed.

Figure 10:
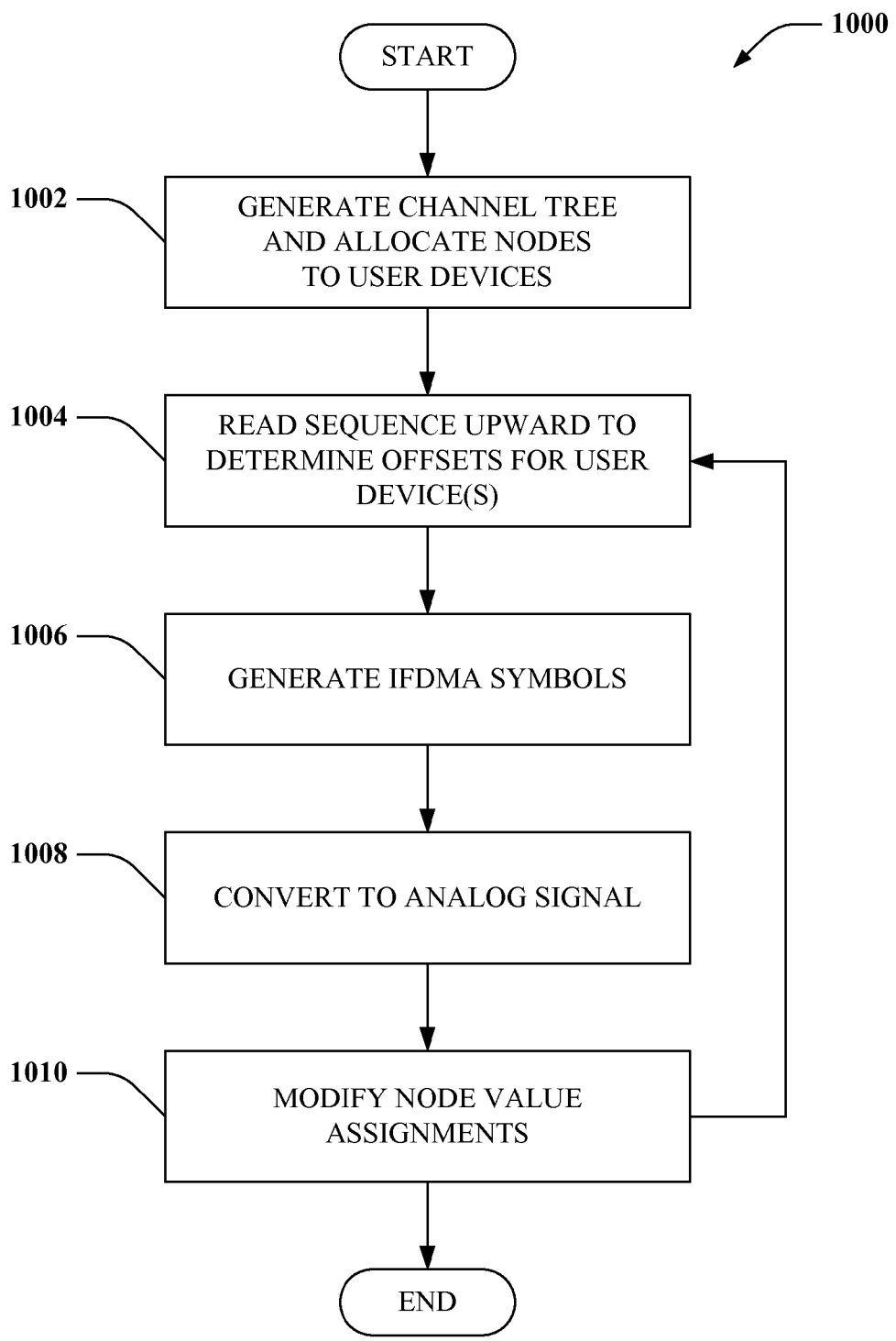
FIG. 10 is an illustration of a methodology for performing frequency hopping in conjunction with an IFDMA modulation protocol in accordance with one or more aspects.

FIG. 10 is an illustration of a methodology 1000 for performing frequency hopping in conjunction with an IFDMA modulation protocol in a wireless network communication environment. At 1002, a channel tree can be generated to facilitate frequency hopping of user offsets. The channel tree can have a root node, and each child node of the root node and/or other parent nodes in the tree can be assigned a node value (e.g., non-binary, binary, integer, etc.) In the case of a binary channel tree, described here for purposes of simplicity of illustration, each child node can have a binary value of 0 or 1, such that a parent node has a 0-child and a 1-child. Nodes can be allocated to user devices depending on subcarrier needs of the user devices, such that a user device requiring a relatively large number of subcarriers can be allocated a node closer to the root node than a user device requiring a relatively small number of subcarriers as detailed with regard to FIGS. 1-3. In certain aspects, the channel tree is pre-generated and the nodes, their relationship and values are stored in a memory in the form of a look-up table or the like.

At 1004, node sequences for user devices can be read upward from a user's allocated node to a first child node of the channel tree to determine a value for the user's offset, as detailed with regard to FIGS. 2 and 3. Information related to an offset identified at 1004 can be gleaned from a lookup table to facilitate assigning a specific subcarrier set to the user. For example, a user allocated a node having a value of 1 that depends from parent node with a value of 1, which in turn depends from a root node of the tree, can be assigned offset 3.

Additionally, because the user-allocated node is three nodes from the top of the tree (inclusive of the allocated node and the root node, which is not read for purposes of offset U determination, but is counted for subcarrier number determination), it can be assigned a number of offset subcarriers equal to $N_{FFT}/4$. According to another example illustrating a binary channel tree, a user having an allocated node that is four nodes from the root node (including the root node) and has a lineage of all 1s (e.g., allocated node=1, parent=1, grandparent=1, root node) can be assigned offset 7 (e.g., binary 111), which can have a number of subcarriers equal to $N_{FFT}/8$, etc. According to yet another example, if the above lineage were 101 (e.g., allocated node=1, parent=0, grandparent=1, root node), the user can be assigned offset 5 having a number of subcarriers equal to $N_{FFT}/8$, etc.

At 1006, IFDMA symbols can be generated as detailed with regard to FIG. 9. Such symbols/signals can be converted to an analog signal at 1008 to facilitate transmission thereof. At 1010, node value assignments can be modified to facilitate frequency hopping to mitigate interference. For example, one or more child node value assignments in the channel tree can be altered in order to vary the offset actually associated with the node allocated to a user. For instance, in the above example, the user assigned offset 7 (e.g., 111 binary) comprising $N_{FFT}/8$ subcarriers can have its parent node pair altered at 1010 so that its node allocation lineage becomes 101 binary, which in turn can result in a reassignment of offset 5 to the user, and so on. According to the example, the user's node allocation can be static during node value assignment variation to ensure that the user retains a number of subcarriers equal to $N_{FFT}/8$. Additionally, user offset modification can be performed according to a predetermined schedule and/or according to a trigger event, such as upon transmission of every IFDMA symbol (symbol rate hopping), every few symbols (block hopping), etc.

It will be appreciated that although the foregoing examples describe a channel tree that utilizes binary node value assignments, non-binary values can be assigned to such nodes. Moreover, parent nodes can have any suitable number of child nodes associated therewith to facilitate allocating offsets to user devices and performing frequency hopping to mitigate interference.

Figure 11:
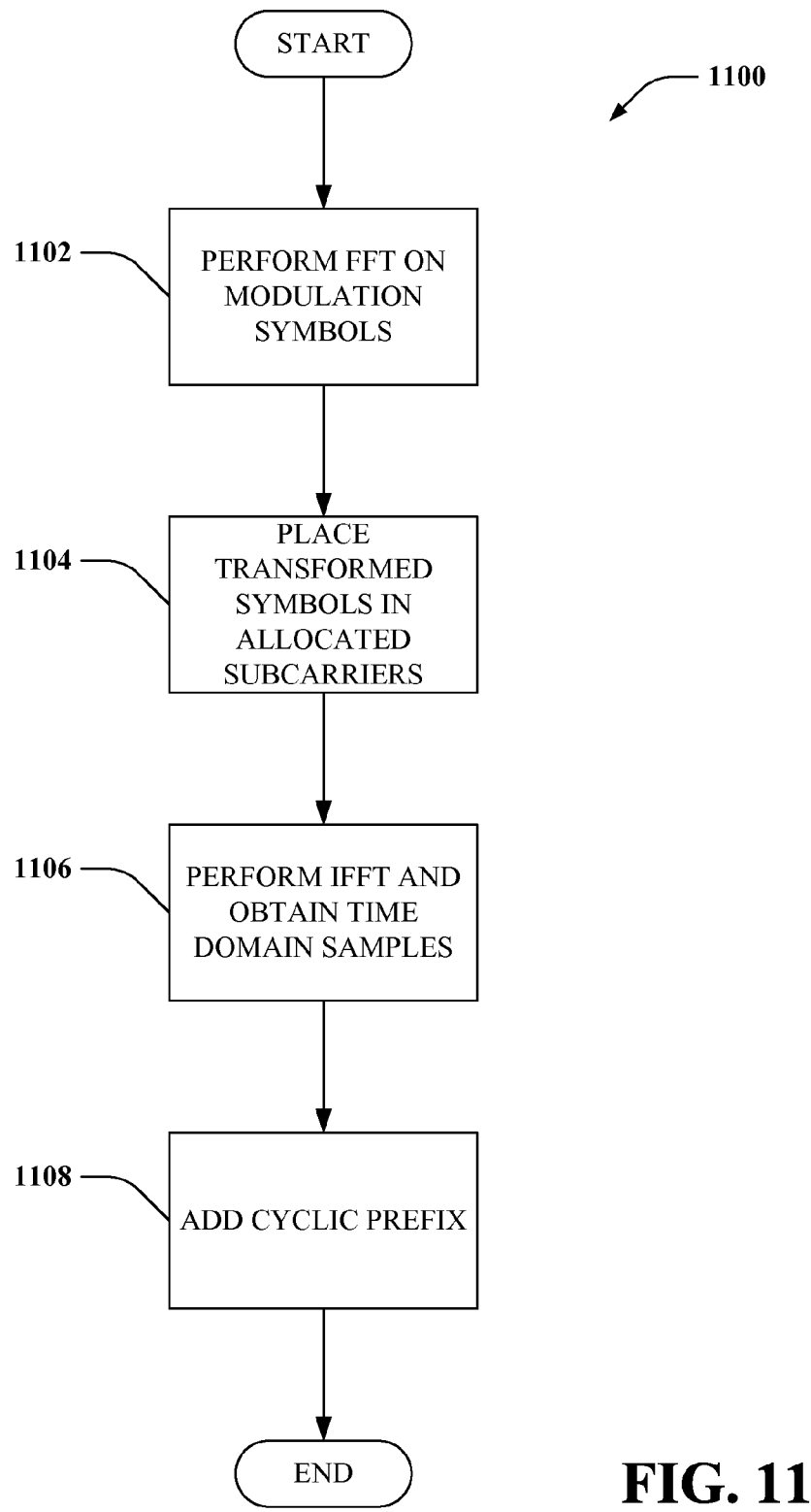
FIG. 11 illustrates a methodology for generating a signal using an LFDMA protocol, such as can be employed in conjunction with a frequency hopping protocol in accordance with one or more aspects.

FIG. 11 illustrates a methodology 1100 for generating a signal using an LFDMA protocol, such as can be employed in conjunction with a frequency hopping protocol to improve interference diversity. At 1102, a user device can initiate generation of a signal comprising N modulation symbols, for example, $[d_0\ d_1\ d_2\ \ldots\ d_{N-1}]$, by taking an N-point fast Fourier transform (FFT) of the N modulation symbols to obtain $[D_0\ D_1\ D_2\ \ldots\ D_{N-1}]$. The transformed symbols can then be placed in allocated subcarriers $[U, U+1, \ldots U+N-1]$ at 1104. At 1106, an $N_{FFT}$-point inverse fast Fourier transform can be performed to obtain $N_{FFT}$ time domain samples. If desired, cyclic prefix can optionally be added to the symbol at 1108 by copying the last $N_{CP}$ time domain samples to the beginning of the symbol to obtain the LFDMA time domain symbol.

Method 1100 can be employed to generate an LFDMA communication signal in conjunction with a frequency hopping technique to mitigate inter-device and/or inter-sector interference. For example, frequency hopping can be performed upon each LFDMA symbol (e.g., utilizing a symbol rate hopping technique), upon every few LFDMA symbols (e.g., utilizing a block hopping technique, etc.

Figure 12:
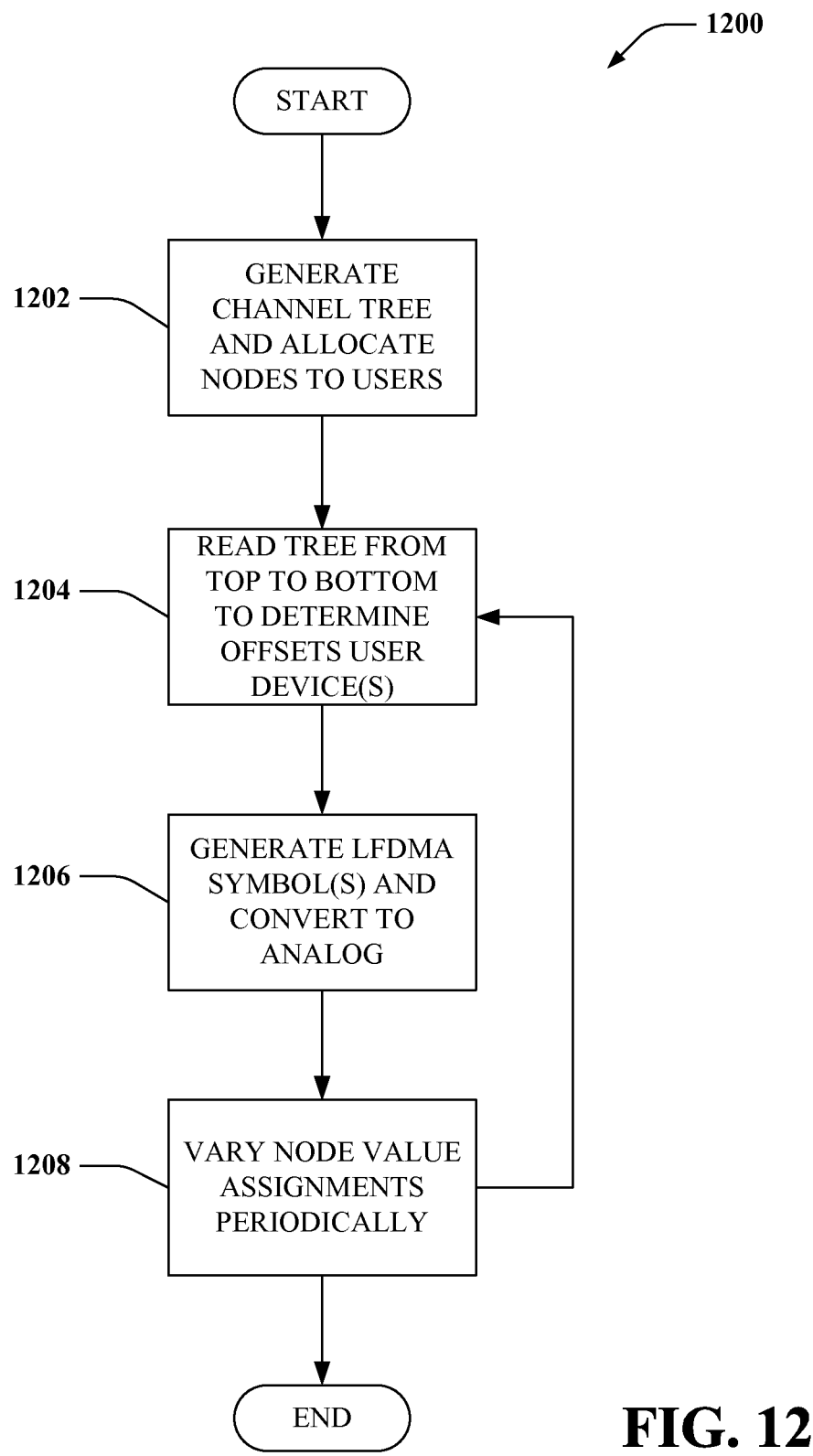
FIG. 12 illustrates a methodology for altering offset assignments for users in an LFDMA wireless communication environment in accordance with one or more aspects.

FIG. 12 illustrates a methodology 1200 for altering offset assignments for users in an LFDMA wireless communication environment. At 1202, channel tree can be generated to map user offset assignments, and nodes in the tree can be allocated to individual users in a wireless network. Node allocation can be performed in a manner similar to that described with regard to FIGS. 1, 2, and 3. In certain aspects, the channel tree is pre-generated and the nodes, their relationship and values are stored in a memory in the form of a look-up table or the like.

At 1204, the channel tree can be read from top to bottom to evaluate user offset assignments. Although the following example describes binary node value assignments for purposes of simplicity, it will be appreciated that non-binary values, and/or any other suitable values, can be assigned to nodes in the channel tree. For instance, a user allocated a node having a value of 1 that depends from parent node with a value of 0, which in turn depends from a root node of the tree, can be assigned offset 1. Additionally, because the user-allocated node is three nodes from the top of the tree (inclusive of the root node, which is not read for purposes of offset U determination, but is counted for subcarrier number determination), it can be assigned a number of offset subcarriers equal to $N_{FFT}/4$. According to another example, a user having an allocated node that is four nodes from the root node (including the root node) and has a lineage of 110 binary (e.g., allocated node=1, parent=1, grandparent=0, root node) can be assigned offset 6 (e.g., binary 110), which can have a number of subcarriers equal to $N_{FFT}/8$, etc. According to yet another example, if the above lineage were 101 (e.g., allocated node=1, parent=0, grandparent=1, root node), the user can be assigned offset 5 having a number of subcarriers equal to $N_{FFT}/8$, etc.

At 1206, an LFDMA signal can be generated as described with regard to FIG. 10 and converted to an analog signal for transmission. At 1208, node value assignments in the channel tree can be varied to facilitate frequency hopping, such as is described with regard to FIG. 11. If desired, user node allocation can be maintained (e.g., static) during node value assignment variation to maintain a constant distance from the root node of the offset tree, which in turn can facilitate ensuring that a precise number of subcarriers are assigned to a given user despite frequency hopping. According to a related aspect, a user whose frequency and/or subcarrier requirements have changed since a previous node allocation iteration can be dynamically reallocated to a node higher or lower on the channel tree based at least in part on information related to the user's resource requirements. In this manner, frequency hopping can be employed in a single carrier FDMA system, such as an LFDMA system to improve interference diversity and provide a more robust communication experience to users of the wireless network employing method 1200.

Figure 13:
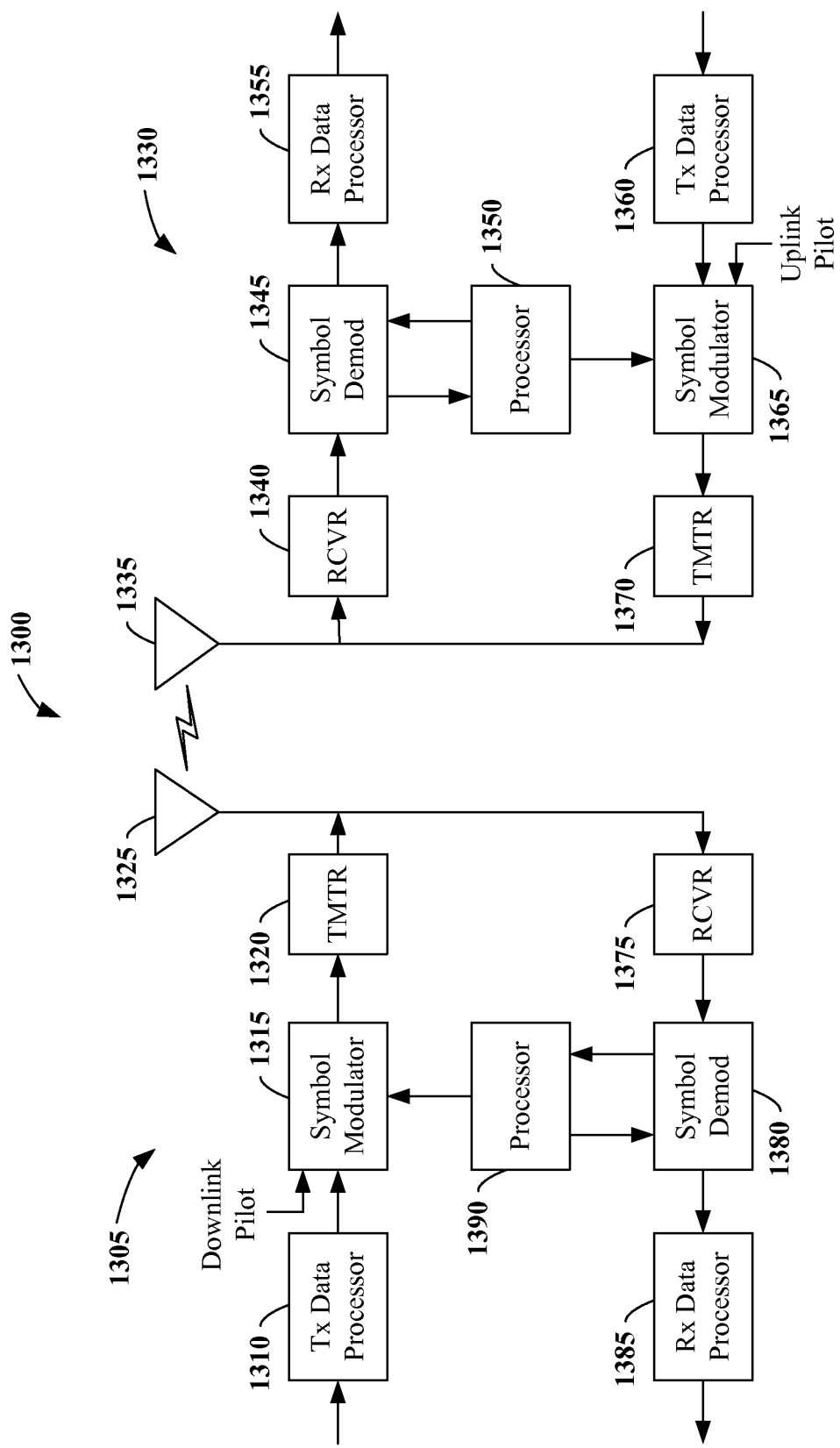
FIG. 13 is an illustration of a wireless network environment that can be employed in conjunction with the various systems and methods described herein in accordance with one or more aspects.

FIG. 13 shows an exemplary wireless communication system 1300. The wireless communication system 1300 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-8) and/or methods (FIGS. 9-12) described herein to facilitate wireless communication there between.

Referring now to FIG. 13, on a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. Symbol modulator 1315 multiplexes data and pilot symbols on the proper subbands, provides a signal value of zero for each unused subband, and obtains a set of N transmit symbols for the N subbands for each symbol period. Each transmit symbol may be a data symbol, a pilot symbol, or a signal value of zero. The pilot symbols may be sent continuously in each symbol period. It will be appreciated that the pilot symbols may be time division multiplexed (TDM), frequency division multiplexed (FDM), or code division multiplexed (CDM). Symbol modulator 1315 can transform each set of N transmit symbols to the time domain using an N-point IFFT to obtain a "transformed" symbol that contains N time-domain chips. Symbol modulator 1315 typically repeats a portion of each transformed symbol to obtain a corresponding symbol. The repeated portion is known as a cyclic prefix and is used to combat delay spread in the wireless channel.

A transmitter unit (TMTR) 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 removes the cyclic prefix appended to each symbol, transforms each received transformed symbol to the frequency domain using an N-point FFT, obtains N received symbols for the N subbands for each symbol period, and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs symbol modulation, and provides a stream of symbols. The pilot symbols may be transmitted on subbands that have been assigned to terminal 1330 for pilot transmission, where the number of pilot subbands for the uplink may be the same or different from the number of pilot subbands for the downlink. A transmitter unit 1370 then receives and processes the stream of symbols to generate an uplink signal, which is transmitted by the antenna 1335 to the access point 1305.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink. Multiple terminals may transmit pilot concurrently on the uplink on their respective assigned sets of pilot subbands, where the pilot subband sets may be interlaced.

Processors 1390 and 1350 direct (e.g., control, coordinate, manage, etc.) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

In further aspects, it is possible to provide a multi-antenna transmitter. In such aspects, a demultiplexer may be provided at the input of TX data processor 1310, which generates multiple streams of data that are separately processed coded and modulated according to different subbands. Additionally, MIMO processing may be provided at the output of the TX data processor 1310 or symbol modulator 1315 so that multiple transmit streams are created prior to transmission but after data processing. At the receiver 1330 various techniques may be utilized to decode the signals from the multiple antennas.

For a multiple-access system (e.g., a frequency division multiple-access (FDMA) system, etc.), multiple terminals may transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus for wireless communication, comprising:
    a memory configured to store information related to a plurality of offsets available for transmission of single-carrier frequency division multiple-access (FDMA) symbols, each of the plurality of offsets being associated with a different starting subcarrier among a plurality of subcarriers available for transmission of single-carrier FDMA symbols; and
    a processor coupled with the memory, the processor configured to assign an offset to a user device and to vary the offset for the user device based on a predetermined pattern.

2. The apparatus of claim 1, wherein the processor is further configured to utilize a channel tree with a plurality of nodes, to assign a node in the channel tree to the user device, and to determine the offset for the user device based on the node assigned to the user device.

3. The apparatus of claim 2, wherein the channel tree is a non-binary channel tree with each non-leaf node having one or more child nodes.

4. The apparatus of claim 3, wherein each child node in the channel tree is assigned a non-binary value.

5. The apparatus of claim 2, wherein the processor is further configured to determine a path between the node assigned to the user device and a root node in the channel tree and to determine the offset for the user device based on the path.

6. The apparatus of claim 5, wherein the processor is further configured to determine a value of the path based on values of nodes in the path and to determine the offset for the user device based on the value of the path.

7. The apparatus of claim 6, wherein the processor is further configured to perform a table lookup to identify an offset corresponding to the value of the path and to assign the identified offset to the user device.

8. The apparatus of claim 2, wherein the processor is further configured to vary the offset for the user device by periodically changing assignments of values to one or more nodes in the channel tree.

9. The apparatus of claim 1, wherein the processor is further configured to determine a number of subcarriers to assign to the user device.

10. The apparatus of claim 1, wherein the processor is further configured to determine the offset for the user device employing an interleaved FDMA (IFDMA) communication protocol.

11. The apparatus of claim 1, wherein the processor is further configured to determine the offset for the user device employing a localized FDMA (LFDMA) communication protocol.

12. The apparatus of claim 1, wherein the processor is further configured to periodically vary the offset for the user device.

13. The apparatus of claim 1, wherein the processor is further configured to employ symbol rate hopping and to vary the offset for the user device upon transmission of each single-carrier FDMA symbol by the user device.

14. The apparatus of claim 1, wherein the processor is further configured to employ block hopping and to vary the offset for the user device upon transmission of a block of single-carrier FDMA symbols by the user device.

15. A method for wireless communication, comprising:
    assigning an offset to a user device, the offset being one of a plurality of offsets available for transmission of single-carrier frequency division multiple-access (FDMA) symbols, each of the plurality of offsets being associated with a different starting subcarrier among a plurality of subcarriers available for transmission of single-carrier FDMA symbols; and
    varying the offset for the user device based on a predetermined pattern.

16. The method of claim 15, further comprising:
    assigning a node in a channel tree to the user device; and
    determining the offset for the user device based on the node assigned to the user device.

17. The method of claim 16, further comprising:
    determining a path between the node assigned to the user device and a root node in the channel tree; and
    determining the offset for the user device based on the path.

18. The method of claim 17, further comprising:
  determining a value of the path based on values of nodes in the path; and
  determining the offset for the user device based on the value of the path.

19. The method of claim 15, further comprising:
  determining a number of subcarriers to assign to the user device.

20. The method of claim 15, wherein the varying the offset comprises varying the offset for the user device upon transmission of a block of single-carrier FDMA symbols by the user device.

21. An apparatus for wireless communication, comprising:
  means for assigning an offset to a user device, the offset being one of a plurality of offsets available for transmission of single-carrier frequency division multiple-access (FDMA) symbols, each of the plurality of offsets being associated with a different starting subcarrier among a plurality of subcarriers available for transmission of single-carrier FDMA symbols; and
  means for varying the offset for the user device based on a predetermined pattern.

22. The apparatus of claim 21, further comprising:
  means for assigning a node in a channel tree to the user device; and
  means for determining the offset for the user device based on the node assigned to the user device.

23. The apparatus of claim 22, further comprising:
  means for determining a path between the node assigned to the user device and a root node in the channel tree; and
  means for determining the offset for the user device based on the path.

24. The apparatus of claim 23, further comprising:
  means for determining a value of the path based on values of nodes in the path; and
  means for determining the offset for the user device based on the value of the path.

25. The apparatus of claim 21, further comprising:
  means for determining a number of subcarriers to assign to the user device.

26. The apparatus of claim 21, wherein the means for varying the offset comprises means for varying the offset for the user device upon transmission of a block of single-carrier FDMA symbols by the user device.

27. A non-transitory computer-readable medium having stored thereon computer-executable instructions for:
  assigning an offset to a user device, the offset being one of a plurality of offsets available for transmission of single-carrier frequency division multiple-access (FDMA) symbols, each of the plurality of offsets being associated with a different starting subcarrier among a plurality of subcarriers available for transmission of single-carrier FDMA symbols; and
  varying the offset for the user device based on a predetermined pattern.

28. The apparatus of claim 1, wherein the processor is further configured to:
  assign a first set of subcarriers determined based on the offset to the user device, and
  assign a second set of subcarriers determined based on the varied offset to the user device.

29. The apparatus of claim 28, wherein the first and second sets of subcarriers are constrained to a portion of system bandwidth.

30. The apparatus of claim 28, wherein the first and second sets include an equal number of subcarriers determined based on a subcarrier set size allocated to the user device and selected from among a plurality of supported subcarrier set sizes.

31. The apparatus of claim 28, wherein the processor is further configured to:
  receive at least one localized frequency division multiple-access (LFDMA) symbol sent on the first set of subcarriers by the user device, and
  receive at least one additional LFDMA symbol sent on the second set of subcarriers by the user device.

32. The apparatus of claim 28, wherein the processor is further configured to:
  receive at least one interleaved frequency division multiple-access (IFDMA) symbol sent on the first set of subcarriers by the user device, and
  receive at least one additional IFDMA symbol sent on the second set of subcarriers by the user device.

33. The method of claim 15, further comprising:
  assigning a first set of subcarriers determined based on the offset to the user device; and
  assigning a second set of subcarriers determined based on the varied offset to the user device.

34. The method of claim 33, wherein the first and second sets of subcarriers are constrained to a portion of system bandwidth.

35. The method of claim 33, wherein the first and second sets include an equal number of subcarriers determined based on a subcarrier set size allocated to the user device and selected from among a plurality of supported subcarrier set sizes.

36. The method of claim 33, further comprising:
  receiving at least one localized frequency division multiple-access (LFDMA) symbol sent on the first set of subcarriers by the user device; and
  receiving at least one additional LFDMA symbol sent on the second set of subcarriers by the user device.

37. The method of claim 33, wherein the processor is further configured to:
  receiving at least one interleaved frequency division multiple-access (IFDMA) symbol sent on the first set of subcarriers by the user device; and
  receiving at least one additional IFDMA symbol sent on the second set of subcarriers by the user device.

38. The apparatus of claim 21, further comprising:
  means for assigning a first set of subcarriers determined based on the offset to the user device; and
  means for assigning a second set of subcarriers determined based on the varied offset to the user device.

39. The apparatus of claim 38, wherein the first and second sets of subcarriers are constrained to a portion of system bandwidth.

40. The apparatus of claim 38, wherein the first and second sets include an equal number of subcarriers determined based on a subcarrier set size allocated to the user device and selected from among a plurality of supported subcarrier set sizes.

41. The apparatus of claim 38, further comprising:
  means for receiving at least one localized frequency division multiple-access (LFDMA) symbol sent on the first set of subcarriers by the user device; and
  means for receiving at least one additional LFDMA symbol sent on the second set of subcarriers by the user device.

42. The apparatus of claim 38, further comprising:
  means for receiving at least one interleaved frequency division multiple-access (IFDMA) symbol sent on the first set of subcarriers by the user device; and means for receiving at least one additional IFDMA symbol sent on the second set of subcarriers by the user device.

43. An apparatus for wireless communication, comprising:
a processor configured to:
receive an assignment of an offset for a user device, the offset being varied based on a predetermined pattern and being one of a plurality of offsets available for transmission of single-carrier frequency division multiple-access (FDMA) symbols, each of the plurality of offsets being associated with a different starting subcarrier among a plurality of subcarriers available for transmission of single-carrier FDMA symbols, and
send at least one single-carrier FDMA symbol based on the assignment.

44. The apparatus of claim 43, wherein the offset for the user device is varied periodically.

45. The apparatus of claim 43, wherein the offset for the user device is varied upon transmission of each single-carrier FDMA symbol by the user device.

46. The apparatus of claim 43, wherein the offset for the user device is varied upon transmission of a block of single-carrier FDMA symbols by the user device.

47. The apparatus of claim 43, wherein the processor is further configured to:
determine a first set of subcarriers assigned to the user device based on the offset for the user device, and
determine a second set of subcarriers assigned to the user device based on a varied offset for the user device.

48. The apparatus of claim 47, wherein the first and second sets of subcarriers are constrained to a portion of system bandwidth.

49. The apparatus of claim 47, wherein the first and second sets include an equal number of subcarriers determined based on a subcarrier set size allocated to the user device and selected from among a plurality of supported subcarrier set sizes.

50. The apparatus of claim 47, wherein the processor is further configured to:
send at least one localized frequency division multiple-access (LFDMA) symbol on the first set of subcarriers, and
send at least one additional LFDMA symbol on the second set of subcarriers.

51. The apparatus of claim 47, wherein the processor is further configured to:
send at least one interleaved frequency division multiple-access (IFDMA) symbol on the first set of subcarriers, and
send at least one additional IFDMA symbol on the second set of subcarriers.

52. A method for wireless communication, comprising:
receiving an assignment of an offset for a user device, the offset being varied based on a predetermined pattern and being one of a plurality of offsets available for transmission of single-carrier frequency division multiple-access (FDMA) symbols, each of the plurality of offsets being associated with a different starting subcarrier among a plurality of subcarriers available for transmission of single-carrier FDMA symbols, and
sending at least one single-carrier FDMA symbol based on the assignment.

53. The method of claim 52, wherein the offset for the user device is varied periodically.

54. The method of claim 52, wherein the offset for the user device is varied upon transmission of each single-carrier FDMA symbol by the user device.

55. The method of claim 52, wherein the offset for the user device is varied upon transmission of a block of single-carrier FDMA symbols by the user device.

56. The method of claim 52, further comprising:
determining a first set of subcarriers assigned to the user device based on the offset for the user device, and
determining a second set of subcarriers assigned to the user device based on a varied offset for the user device.

57. The method of claim 56, wherein the first and second sets of subcarriers are constrained to a portion of system bandwidth.

58. The method of claim 56, wherein the first and second sets include an equal number of subcarriers determined based on a subcarrier set size allocated to the user device and selected from among a plurality of supported subcarrier set sizes.

59. The method of claim 56, wherein the sending at least one single-carrier FDMA symbol comprises
sending at least one localized frequency division multiple-access (LFDMA) symbol on the first set of subcarriers, and
sending at least one additional LFDMA symbol on the second set of subcarriers.

60. The method of claim 56, wherein the sending at least one single-carrier FDMA symbol comprises
sending at least one interleaved frequency division multiple-access (IFDMA) symbol on the first set of subcarriers, and
sending at least one additional IFDMA symbol on the second set of subcarriers.

61. An apparatus for wireless communication, comprising:
means for receiving an assignment of an offset for a user device, the offset being varied based on a predetermined pattern and being one of a plurality of offsets available for transmission of single-carrier frequency division multiple-access (FDMA) symbols, each of the plurality of offsets being associated with a different starting subcarrier among a plurality of subcarriers available for transmission of single-carrier FDMA symbols, and
means for sending at least one single-carrier FDMA symbol based on the assignment.

62. The apparatus of claim 61, wherein the offset for the user device is varied periodically.

63. The apparatus of claim 61, wherein the offset for the user device is varied upon transmission of each single-carrier FDMA symbol by the user device.

64. The apparatus of claim 61, wherein the offset for the user device is varied upon transmission of a block of single-carrier FDMA symbols by the user device.

65. The apparatus of claim 61, further comprising:
means for determining a first set of subcarriers assigned to the user device based on the offset for the user device, and
means for determining a second set of subcarriers assigned to the user device based on a varied offset for the user device.

66. The apparatus of claim 65, wherein the first and second sets of subcarriers are constrained to a portion of system bandwidth.

67. The apparatus of claim 65, wherein the first and second sets include an equal number of subcarriers determined based on a subcarrier set size allocated to the user device and selected from among a plurality of supported subcarrier set sizes.

68. The apparatus of claim 65, wherein the means for sending at least one single-carrier FDMA symbol comprises means for sending at least one localized frequency division multiple-access (LFDMA) symbol on the first set of subcarriers, and means for sending at least one additional LFDMA symbol on the second set of subcarriers.

69. The apparatus of claim 65, wherein the means for sending at least one single-carrier FDMA symbol comprises means for sending at least one interleaved frequency division multiple-access (IFDMA) symbol on the first set of subcarriers, and means for sending at least one additional IFDMA symbol on the second set of subcarriers.

70. A non-transitory computer-readable medium having stored thereon computer-executable instructions for:

receiving an assignment of an offset for a user device, the offset being varied based on a predetermined pattern and being one of a plurality of offsets available for transmission of single-carrier frequency division multiple-access (FDMA) symbols, each of the plurality of offsets being associated with a different starting subcarrier among a plurality of subcarriers available for transmission of single-carrier FDMA symbols, and sending at least one single-carrier FDMA symbol based on the assignment.

* * * * *